(12) United States Patent
McManus et al.

(10) Patent No.: US 9,984,385 B2
(45) Date of Patent: May 29, 2018

(54) CADDIES AND CADDY SYSTEMS WITH DISPLAY CAPABILITIES

(71) Applicants: John Thomas McManus, Alpharetta, GA (US); Paul Byrd, Milton, GA (US)

(72) Inventors: John Thomas McManus, Alpharetta, GA (US); Paul Byrd, Milton, GA (US)

(73) Assignee: MEDIA CADDY, LLC, Canton, GA (US)

( * ) Notice: Subject to any disclaimer, the term of this patent is extended or adjusted under 35 U.S.C. 154(b) by 624 days.

(21) Appl. No.: 14/049,937

(22) Filed: Oct. 9, 2013

(65) Prior Publication Data

US 2014/0100926 A1 Apr. 10, 2014

Related U.S. Application Data

(63) Continuation-in-part of application No. 13/029,192, filed on Feb. 17, 2011.

(60) Provisional application No. 61/318,369, filed on Mar. 28, 2010, provisional application No. 61/383,476, filed on Sep. 16, 2010.

(51) Int. Cl.
| | |
|---|---|
| *G06Q 30/02* | (2012.01) |
| *G06Q 50/12* | (2012.01) |
| *B65D 25/04* | (2006.01) |
| *G09F 9/30* | (2006.01) |
| *G09F 27/00* | (2006.01) |

(52) U.S. Cl.
CPC ......... *G06Q 30/0241* (2013.01); *B65D 25/04* (2013.01); *G06Q 50/12* (2013.01); *G09F 9/30* (2013.01); *G09F 27/00* (2013.01)

(58) Field of Classification Search
CPC .................. B65D 25/04; G06Q 50/12; G06Q 30/0207–30/0277

USPC .............. 206/459.1, 561; 220/527, 553–556; 229/115, 116; 340/286.09; D03/315; D09/769, 771; D14/127, 129; 705/14.1–14.73, 15; 211/13.1, 10
See application file for complete search history.

(56) References Cited

U.S. PATENT DOCUMENTS

| | | | | | |
|---|---|---|---|---|---|
| 2,198,459 | A | * | 4/1940 | Potts | A47F 5/04 206/561 |
| D175,790 | S | * | 10/1955 | McCann | 312/285 |
| 3,661,319 | A | * | 5/1972 | Koehler | B65D 5/3628 229/108.1 |
| 4,432,151 | A | | 2/1984 | Morris | |
| 4,884,713 | A | * | 12/1989 | Handler | B43M 99/008 206/504 |
| 4,967,496 | A | * | 11/1990 | Kyler | G09F 23/06 40/124.2 |
| D321,788 | S | * | 11/1991 | Chen | 220/524 |

(Continued)

OTHER PUBLICATIONS

Photographs of Applicant's prior version of the product, which was first introduced to the public on or about Feb. 23, 2011.

*Primary Examiner* — Mathew R. Syrowik

(74) *Attorney, Agent, or Firm* — McClure, Qualey & Rodack, LLP

(57) ABSTRACT

Caddies and caddy systems are provided. In this regard, a representative system includes a plurality of caddies located in the establishment, wherein each of the caddies incorporates: a housing, a display unit, a tray and at least one compartment for storing items for use by the patrons; the display unit being detachably mounted to the housing and having a touchscreen display for obtaining input from patrons in the establishment.

11 Claims, 22 Drawing Sheets

(56) References Cited

U.S. PATENT DOCUMENTS

| | | | | |
|---|---|---|---|---|
| 5,086,917 | A * | 2/1992 | Dziersk | A47L 13/51 |
| | | | | 206/203 |
| 5,347,734 | A * | 9/1994 | Howell | G09F 1/10 |
| | | | | 211/163 |
| 5,379,906 | A * | 1/1995 | Levin | A47B 47/0025 |
| | | | | 211/12 |
| 5,701,694 | A | 12/1997 | Atkinson | |
| D396,170 | S * | 7/1998 | Conway | D7/590 |
| 5,931,383 | A * | 8/1999 | Palmer | A47G 21/182 |
| | | | | 239/33 |
| 6,026,983 | A * | 2/2000 | Graham | A47G 23/0216 |
| | | | | 220/738 |
| 6,629,607 | B1 * | 10/2003 | Gibson | A45C 11/20 |
| | | | | 206/551 |
| 6,636,835 | B2 | 10/2003 | Ragsdale-Elliot et al. | |
| 6,975,207 | B1 | 12/2005 | Shmelzer | |
| 7,156,226 | B1 * | 1/2007 | Van Sickle | A45C 11/20 |
| | | | | 206/1.5 |
| 2002/0190110 | A1 * | 12/2002 | Polloni | B65D 15/06 |
| | | | | 229/5.5 |
| 2003/0010728 | A1 * | 1/2003 | Lanman | B43M 99/001 |
| | | | | 211/10 |
| 2003/0071806 | A1 | 4/2003 | Annand | |
| 2004/0206517 | A1 * | 10/2004 | Gibbs | A01B 1/00 |
| | | | | 172/42 |
| 2006/0169691 | A1 * | 8/2006 | Rothschild | A45C 7/0036 |
| | | | | 220/7 |
| 2007/0252489 | A1 * | 11/2007 | Schulz | G09F 15/00 |
| | | | | 312/7.2 |
| 2008/0011697 | A1 * | 1/2008 | Berg | A47B 49/00 |
| | | | | 211/78 |
| 2008/0235097 | A1 | 9/2008 | Armstrong | |
| 2008/0235098 | A1 | 9/2008 | Armstrong | |
| 2008/0235099 | A1 | 9/2008 | Armstrong | |
| 2008/0235100 | A1 | 9/2008 | Armstrong | |
| 2009/0063274 | A1 | 3/2009 | Dublin et al. | |
| 2009/0139880 | A1 * | 6/2009 | Abdullah | A45C 11/34 |
| | | | | 206/214 |
| 2009/0166245 | A1 * | 7/2009 | Cetera | A47G 23/00 |
| | | | | 206/562 |
| 2009/0319381 | A1 | 12/2009 | Armstrong | |
| 2010/0059460 | A1 * | 3/2010 | Mulaw | A47L 19/04 |
| | | | | 211/41.3 |
| 2010/0108707 | A1 * | 5/2010 | Ruman | A47F 3/02 |
| | | | | 221/199 |
| 2011/0048995 | A1 * | 3/2011 | Keller | A47G 23/02 |
| | | | | 206/427 |
| 2011/0238467 | A1 * | 9/2011 | Duley | G06Q 30/02 |
| | | | | 705/14.4 |
| 2011/0271708 | A1 * | 11/2011 | Baker | A47G 23/0208 |
| | | | | 62/457.5 |
| 2013/0020358 | A1 * | 1/2013 | Azzoz | A45C 11/20 |
| | | | | 224/191 |
| 2013/0193148 | A1 * | 8/2013 | Fula | B65D 25/04 |
| | | | | 220/520 |
| 2014/0100926 | A1 * | 4/2014 | McManus | G09F 9/30 |
| | | | | 705/14.4 |
| 2014/0272044 | A1 * | 9/2014 | Nguyen | B65D 25/08 |
| | | | | 426/394 |
| 2014/0327387 | A1 * | 11/2014 | Romanenko | H02J 7/0027 |
| | | | | 320/107 |
| 2014/0346084 | A1 * | 11/2014 | Finell | A47G 23/0633 |
| | | | | 206/565 |

* cited by examiner

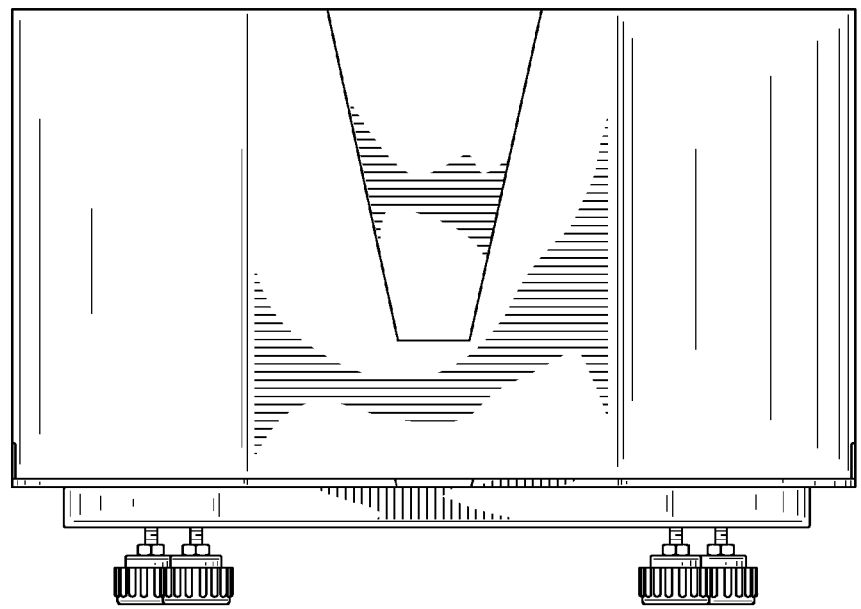
FIG. 24
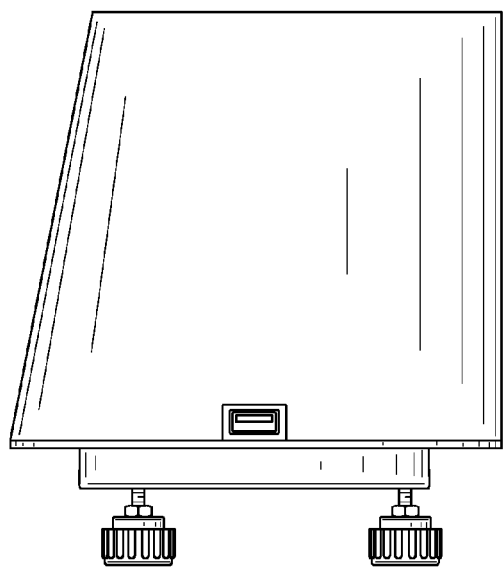 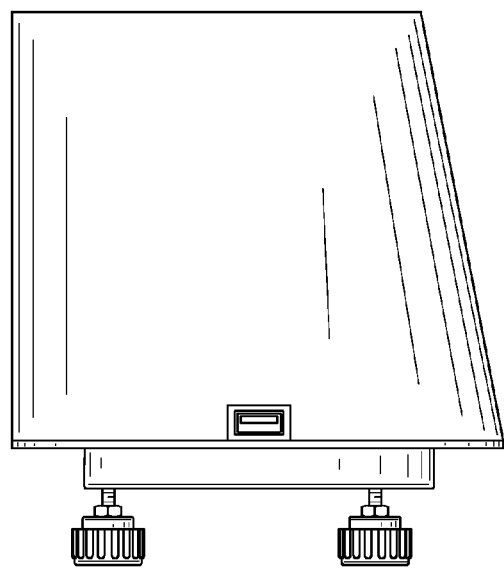
FIG. 25     FIG. 26

# CADDIES AND CADDY SYSTEMS WITH DISPLAY CAPABILITIES

CROSS-REFERENCE TO RELATED APPLICATION

This application is a continuation-in-part of U.S. application Ser. No. 13/029,192 entitled "Caddie Apparatus with Display Capabilities," filed Feb. 17, 2011, which claims priority to, and the benefit of, U.S. Provisional Patent Application entitled, "Media Bar Caddie," having Ser. No. 61/318,369, filed on Mar. 29, 2010, and to U.S. Provisional Patent Application entitled, "Caddie with Display," having Ser. No. 61/383,476, filed on Sep. 16, 2010, all of which are incorporated herein by reference in their entireties.

TECHNICAL FIELD

The present disclosure generally relates to a caddy apparatus, and more particularly to caddy of the type used in restaurants and bars or lounges.

BACKGROUND

Restaurants, bars, and other establishments frequently rely on paper advertisements provided on dining tables and counters for patrons to view. One perceived shortcoming, however, is that such advertisements are static in nature and display only a very limited amount of information. Furthermore, paper advertisements can be relatively expensive to print. A need therefore exists for a more efficient means of conveying information to patrons in an establishment.

SUMMARY

Briefly described, one embodiment, among others, is a system for conveying digital content to patrons in an establishment. The system comprises a plurality of caddies located in the establishment, wherein each of the caddies comprises: a housing, a display unit, a tray and at least one compartment for storing items for use by the patrons; the display unit being detachably mounted to the housing and having a touchscreen display for obtaining input from patrons in the establishment.

Another embodiment is a caddy for conveying content to patrons in an establishment, comprising: a housing, a display unit, a tray and at least one compartment for storing items for use by the patrons; the display unit being mounted to the housing and having a display for displaying customized content to the patrons in the establishment.

Another embodiment is a caddy for conveying content to patrons in an establishment, comprising: a housing, a display unit, and at least one compartment within the housing for storing items for use by the patrons, wherein the at least compartment further comprises a removable insert for storing the items, the removable insert being configured with a plurality of openings for receiving the items. The display unit is mounted to the housing and having a display for displaying customized content to the patrons in the establishment.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 24 is a rear view of the caddy depicted in FIG. 22.

FIG. 25 is a right side view of the caddy depicted in FIG. 22.

FIG. 26 is a left side view of the caddy depicted in FIG. 22.

DETAILED DESCRIPTION

Figure 1:
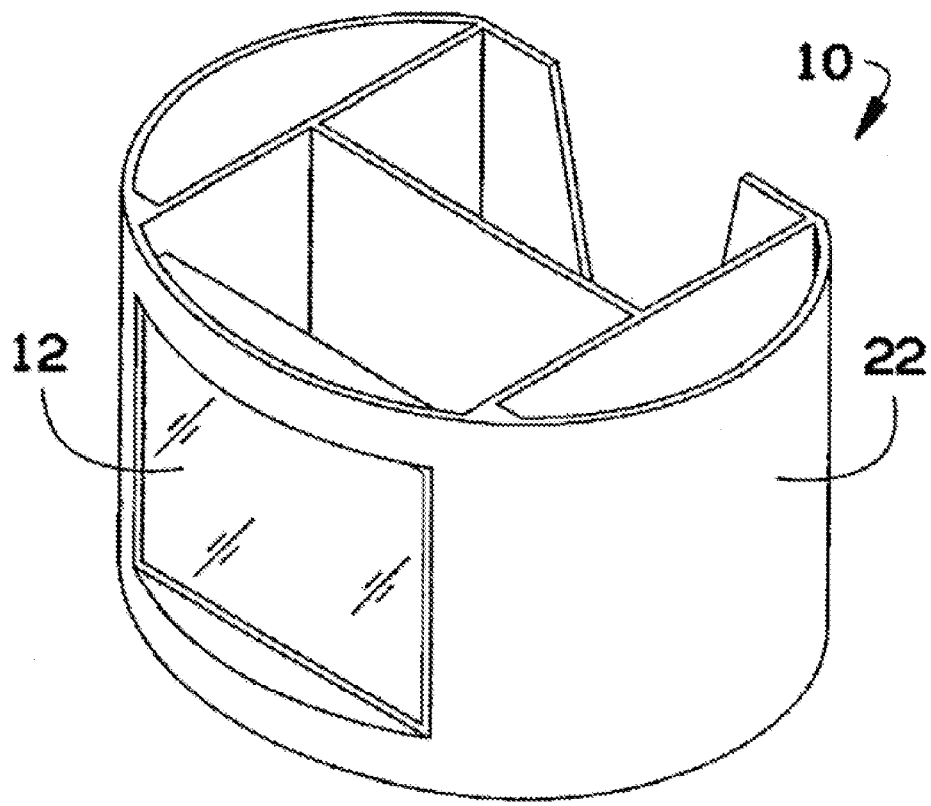
FIG. 1 is a perspective view of a caddy constructed in accordance with one embodiment.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Caddies or carriers are frequently used in restaurants or bars for holding utensils, salt and pepper shakers, napkins, straws, coasters, condiments, or other items. Various embodiments are described that are broadly directed to caddies or carriers having an integrated electronic display for actively displaying information to patrons. The use of active displays allows establishments to reduce or eliminate paper marketing items and the corresponding expense for producing such items. Significantly, the use of displays with actively changing content allows a much larger number of ads or other materials to be presented to patrons. While the content display to patrons may comprise audio/video, the content display may also comprise static content such as non-moving text in order to avoid being a distraction to patrons. The caddies (e.g., restaurant caddies, bar caddies, etc.) disclosed herein allow establishments to convey information in a simple and efficient means in a centralized manner.

In addition to marketing materials, such content as menu items and specials can also be displayed. In accordance with exemplary embodiments, the display is a flat-panel display comprising, for example, a liquid crystal display (LCD) that is sized appropriately for the particular caddie/carrier. It should be emphasized that while various embodiments are described herein in the context of a restaurant or bar, the caddy apparatus may be implemented in any type of establishment (e.g., coffee shops, stores) where a need exists for communicating information to patrons or customers. Modifications may be made to the embodiments described herein without departing from the principles of the present disclosure. All such modifications and variations are intended to be included herein within the scope of this disclosure and protected by the following claims.

Figure 2:
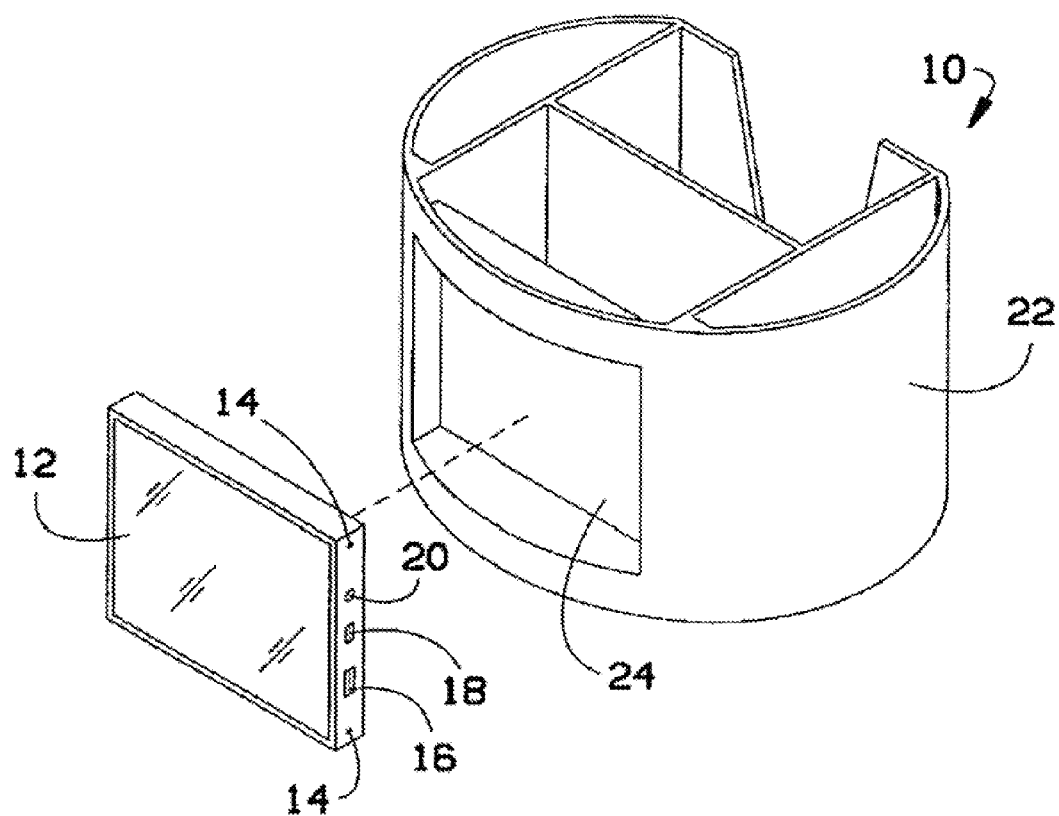
FIG. 2 is an exploded perspective view of the caddy in FIG. 1.

Reference is made to FIG. 1, which is a perspective view of a caddy constructed in accordance with one embodiment. The caddy 10 includes a display unit 12, which may comprise, for example, an LCD. The body 22 of the caddy 10 may comprise a casing/mold, which can be of any of a number of shapes, sizes, or storage configurations. The body 22 houses one or more display units 12 of a variety of shapes. With reference to FIG. 2, the display 12 in the caddy 10 may be constructed to include a series of connection holes 14 for mounting the display 12 into the body 22 of the caddy 10 in the cavity 24 shown.

As will be discussed in more detail later, the caddy 10 may include various interfaces, including, but not limited to, a USB port 16 and a mini USB port 18. In accordance with some embodiments, the display 12 may be detachably mounted to the body 22 of the caddy. For some embodiments, the display may be battery powered and may include on-board memory such that the display 12 is self-contained. In this regard, the display 12 may be easily detached and replaced with another display by removing the display 12 from the cavity 24. The display 12 further comprises an audio port 20.

Figure 3:
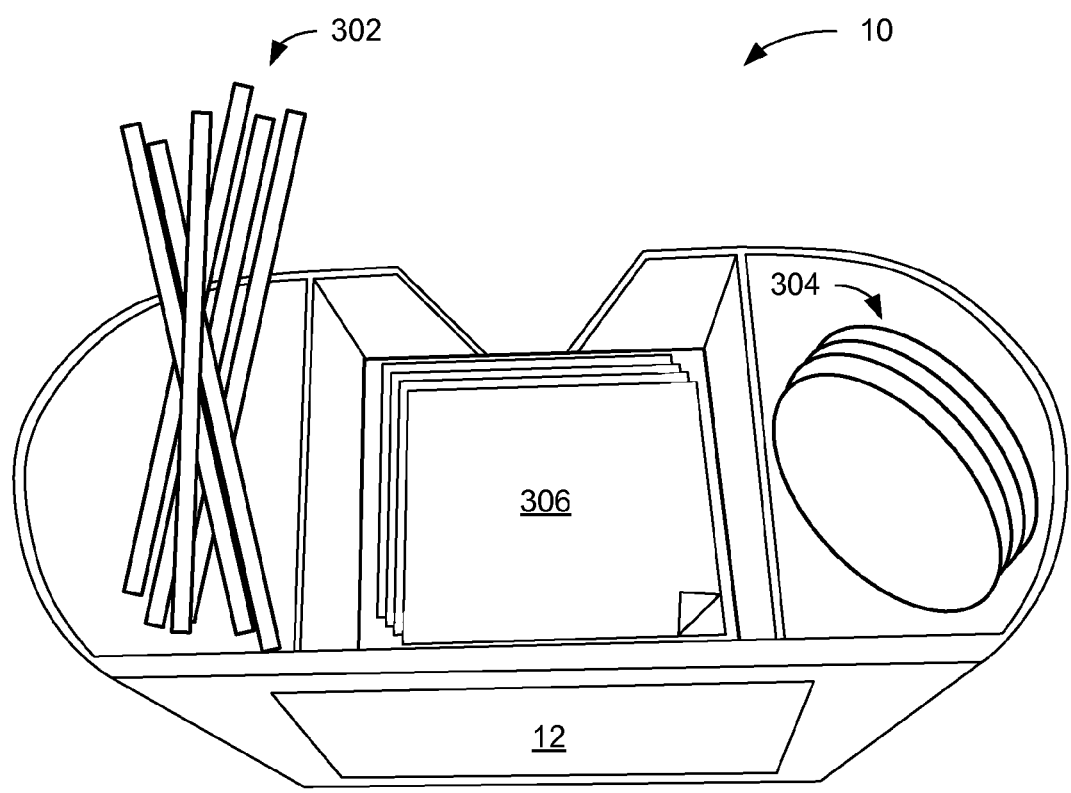
FIG. 3 is a top view of an embodiment of the caddy in FIG. 1.

As shown in FIGS. 2 and 3, the caddy 10 includes a number of compartments formed by wall members for storing such items as straws 302, coasters 304, and napkins 306. Other items may include utensils, salt/pepper shakers, condiments, etc. for patrons to use. The body of the caddy 10 is defined by the housing 22, which may be constructed of plastic (e.g., via injection molding) or other suitable material. As described earlier, the display unit 12 is coupled to the housing 22 such that the compartments in the caddy 10 are in close proximity to the display unit 12. The display unit 12 is preferably a flat-panel display, such as an LCD, in order to minimize the amount of space required for the display unit 12. The caddy 10 is configured to actively display a variety of content including advertisements (generated, for example, by the establishment or by a third party), menu items, restaurant specials, news, weather, sports, etc.

Figure 4:
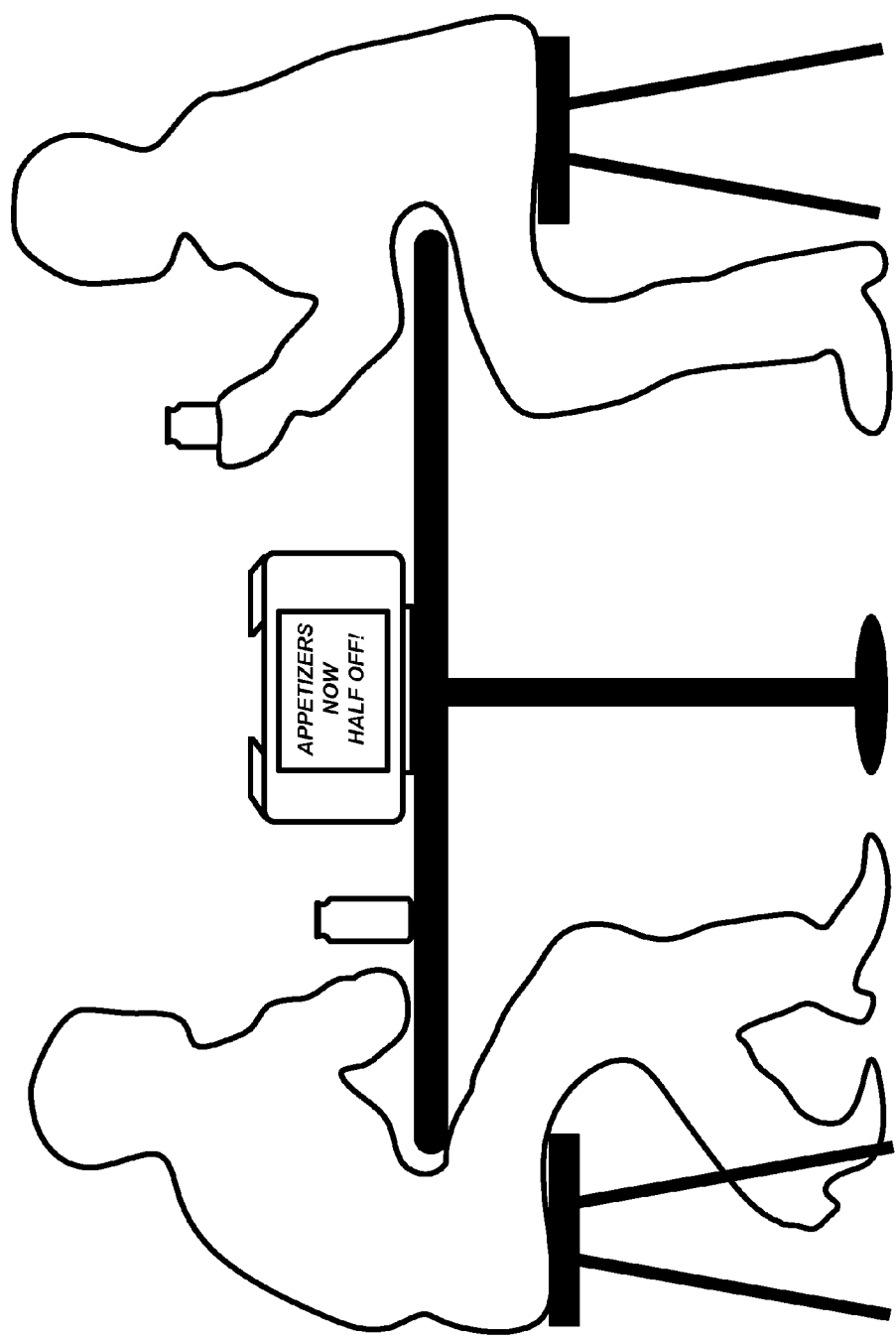
FIG. 4 illustrates the caddy in operation.

Reference is made to FIG. 4, which illustrates the caddy in use in a bar or restaurant setting. In the case of advertisements, the use of an active, content-controllable display allows the restaurant or bar to exhibit a greater variety of advertisements to patrons than traditional print media at a fraction of the cost. Restaurants and bar frequently provide a paper advertisement such as a tri-fold ad on the table top. Such advertisements, however, are static, and consequently only display a very limited amount of information to a given patron. Furthermore, once the advertisements are no longer relevant, the paper advertisements are discarded. Paper advertisements are also relatively expensive to produce. In contrast, an active, electronic display is capable of cycling through a variety of different ads or other content during the course of a single meal. Furthermore, the restaurant/bar can control the timing of messages/ads shown to patrons. For example, in the illustration depicted in FIG. 4, the restaurant configures the caddy to notify patrons that appetizers are currently half off in an effort to generate more sales. The restaurant/bar may later configure the caddy to display a different message (e.g., the dinner special for that day). Note that the caddy can also be configured to display other general information such as weather information, news, game scores, and so on.

Figure 5:
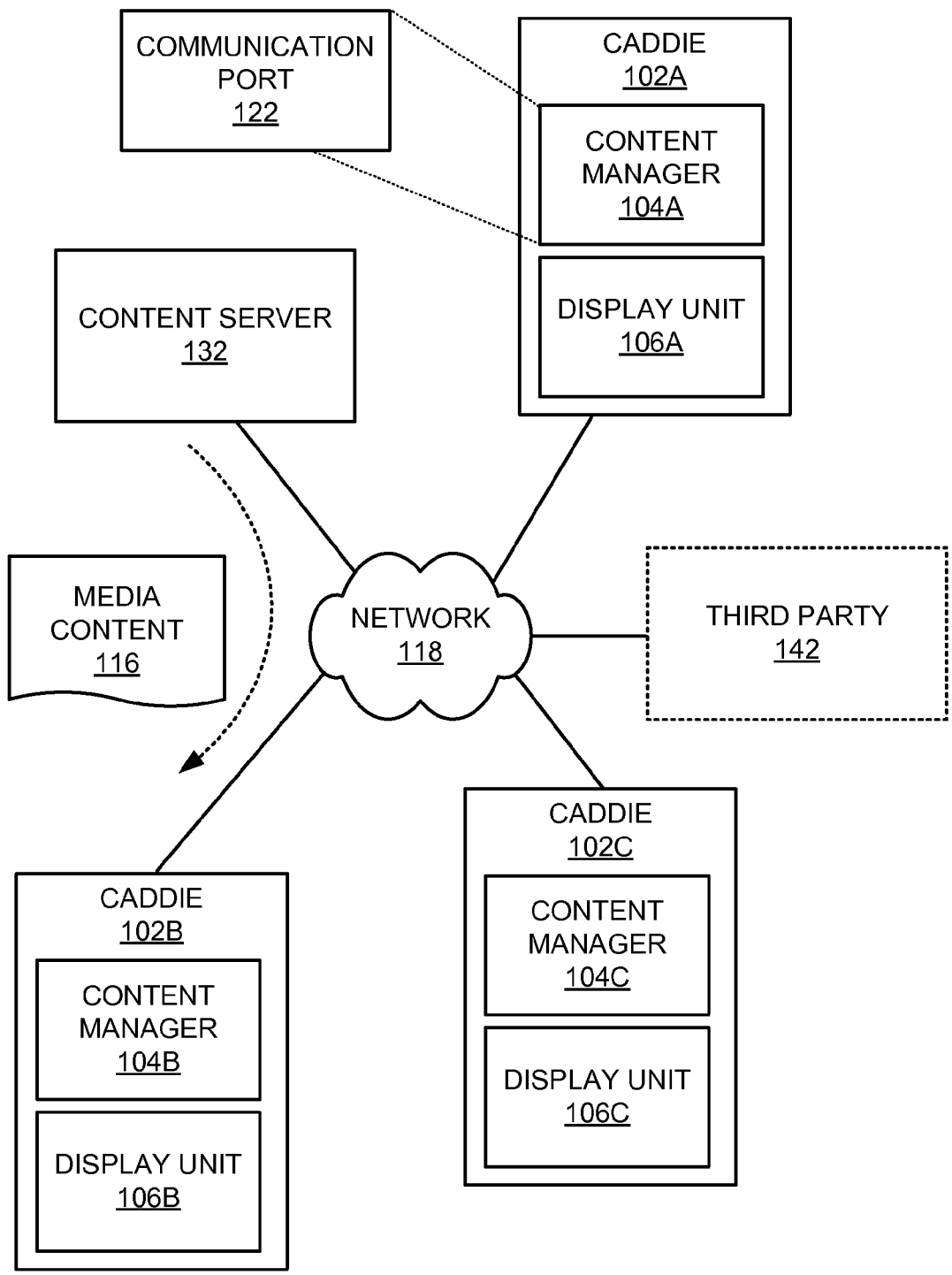
FIG. 5 depicts a block diagram of a networked environment in which embodiments of the caddy shown in FIG. 1 may be implemented in accordance with various embodiments.

Reference is made to FIG. 5, which depicts a block diagram of a networked environment in which embodiments of the caddy 102A-C may be implemented. The network generally includes a plurality of caddies 102A-C, where each caddy 102A-C comprises a content manager 104A-C and a display unit 106A-B. The content manager 104A-C is configured to interface with a content server 132 controlled by the restaurant. The content server 132 provides centralized control over the caddies 102A-C in the network. Each of the caddies 104A-C are communicatively coupled to the content server 132 via a network 118. The content manager 104A in each of the caddies 102A-C includes a communication port 122, which may comprise a USB port, mini-USB port, Ethernet port, network interface controller (NIC), and other interfaces for transmitting and receiving data. Each caddy 102A-C receives media content 116 from the content server 132 via the communication port 122. The media content 116 comprises such audio/video content as advertisements, announcements, news, game scores, and so on. The communication port 122 may also be connected, for example, to a general purpose computer to receive data uploads or program updates. In some embodiments, the communication portion (e.g., Ethernet port) may be coupled to a computer network, where content updates are regularly provided or changed.

As shown in FIG. 5, the networked environment may further comprise a third party 142 coupled to the network 118. In some cases, a supplier/vendor for the restaurant (for example, a beverage supplier) may wish to send the restaurant specific ads for patrons to view. As an example, consider the scenario where a brewery provides a particular brand of beer to the restaurant. The brewery may wish for patrons to view ads on other beers offered by that brewery. The brewery (i.e, the third party 142 in FIG. 5) provides the media content 116 to the content server 132 (i.e., the restaurant). The content server 132 then controls the transmission of the media content 116 (advertisements) to the caddies 102A-C for the patrons to view. In this regard, the restaurant is able to control transmission of all the content viewed by its patrons via the content server 132. Note, however, that in accordance with alternative embodiments, the content server 132 may give third parties 142 permission to convey media content 116 directly to the caddies 102A-C.

Figure 6:
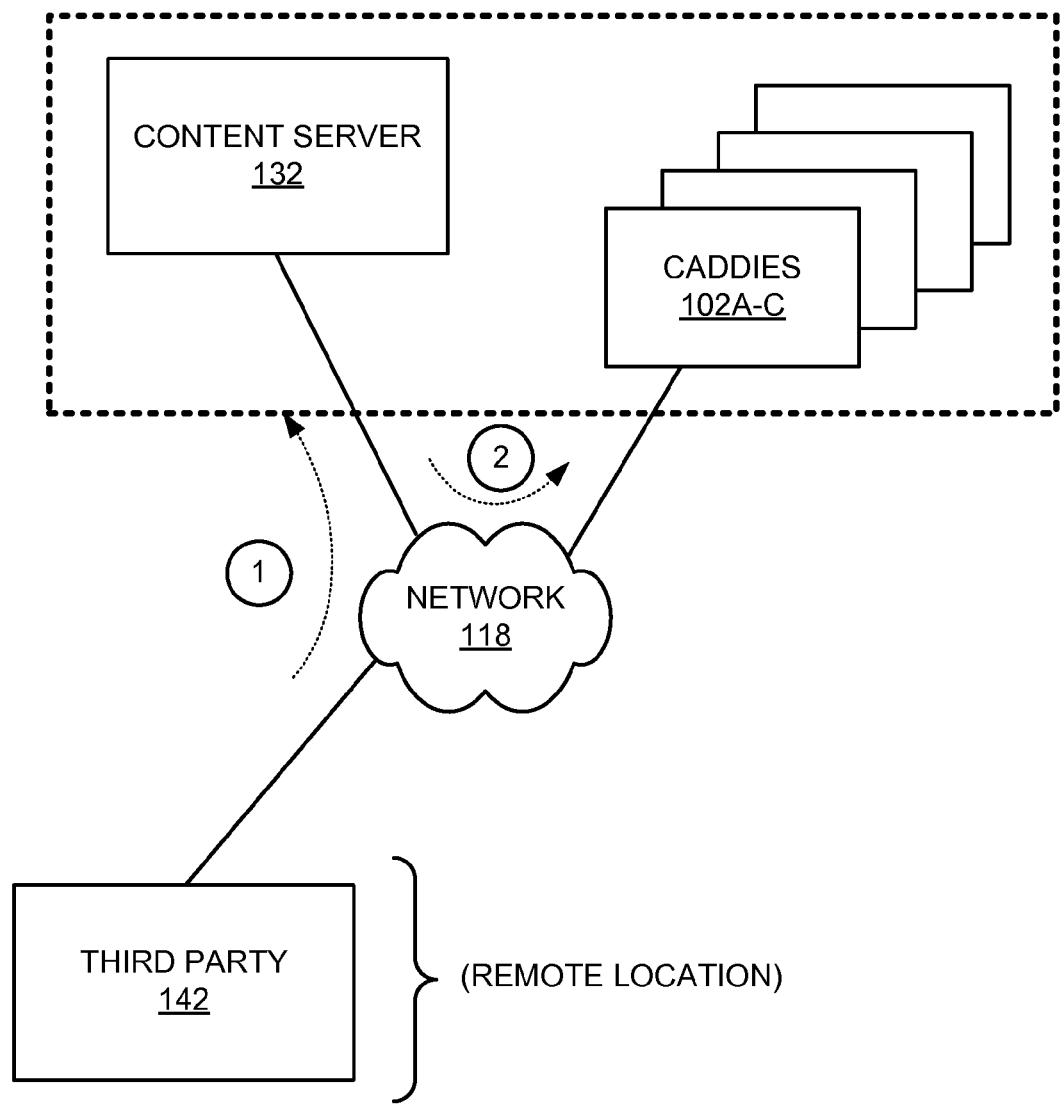
FIG. 6 illustrates a networked environment in which the third party is at a remote location with respect to the content server in accordance with various embodiments.

FIG. 6 illustrates a networked environment in which the third party 142 is at a remote location with respect to the content server 132, which is typically incorporated in the restaurant or establishment. The third party 142 communicates with the content server 132, and in some embodiments, directly with the caddies 102A-C. Note, however, that the system may be configured such that the content server 132 operates as a gateway through which content from the third party 142 must pass. This allows the content server 132 (i.e., the establishment) to maintain full control over the content delivered to the caddies 102.

Figure 7:
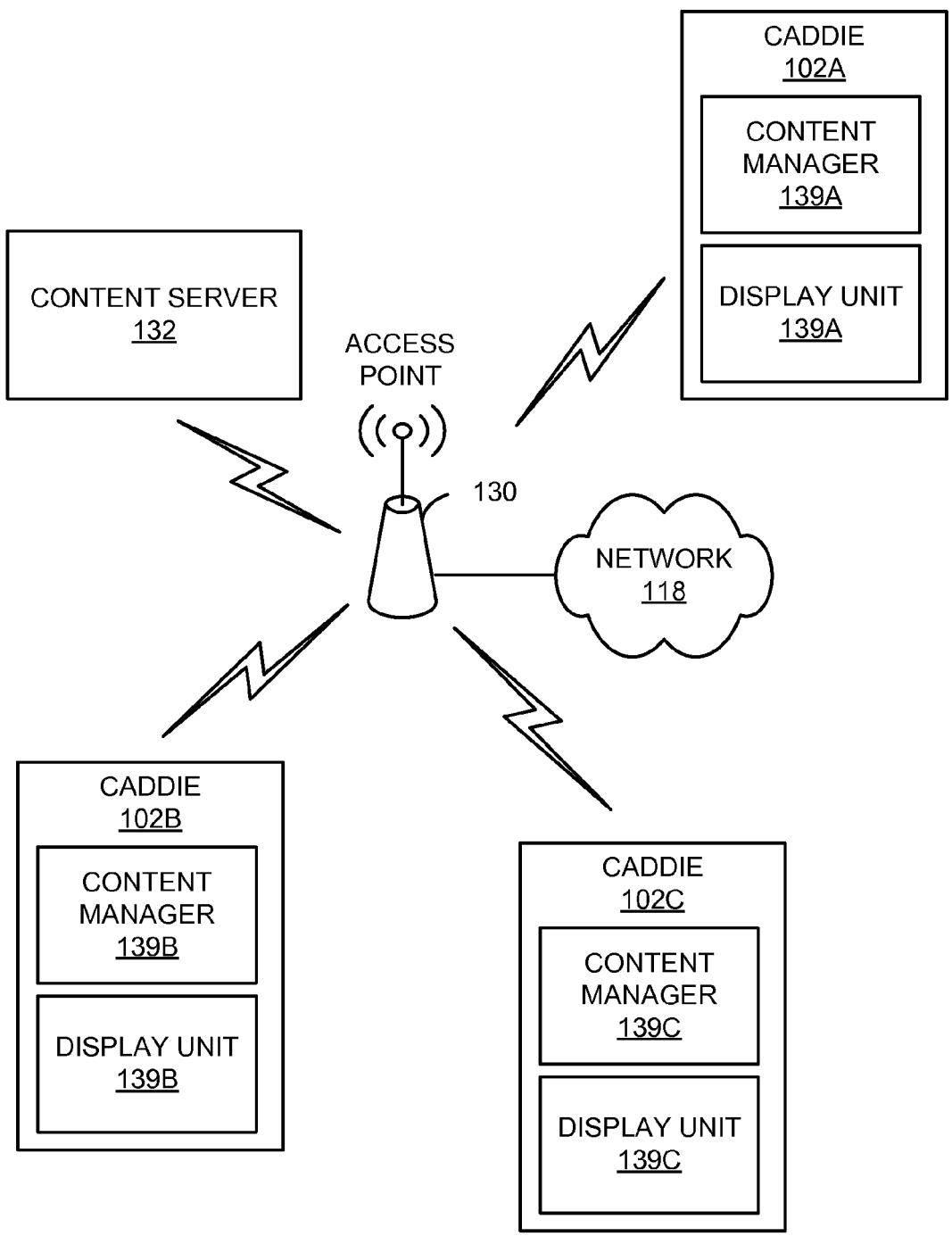
FIG. 7 illustrates a networked environment in which the caddies communicate with the content server via a wireless network in accordance with various embodiments.

FIG. 7 illustrates a networked environment in which the caddies 102A-C communicate with the content server 132 via a wireless network. As shown, the caddies 102A-C and the content server 132 may be wirelessly connected via an access point 130. Although not specifically illustrated, a wired port may be provided in addition to the wireless transceiver. A wireless transceiver integrated in the communication port 122 within each caddy 102A-C may be configured to communicate with the content server 132. In one embodiment, the wireless transceiver may communicate with other devices via an IEEE 802.11 network, a cellular network, or via other communication protocols. Media content 116 may be provided to the caddy 102A-C for display via the wireless transceiver with the data being stored in memory.

Figure 8:
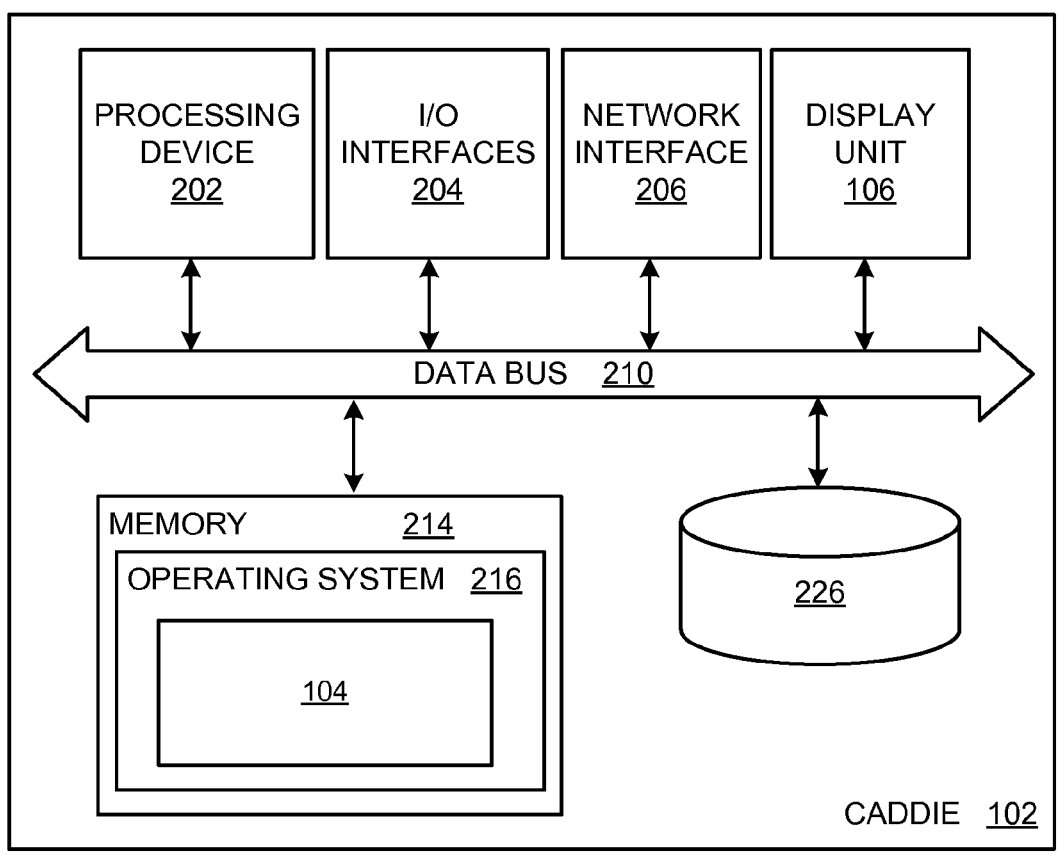
FIG. 8 shows various components of the caddy depicted in FIGS. 5-7.

FIG. 8 shows various components of the caddy depicted in FIGS. 5-7. The caddy 102 may be embodied in any one of a wide variety of wired and/or wireless computing devices, multiprocessor computing device, and so forth incorporated into the body of the caddy 10 shown in FIGS. 1 and 2. As shown in FIG. 8, each caddy 102 comprises memory 214, a processing device 202, a number of input/output interfaces 204, a display unit 106, and mass storage 226, wherein each of these devices are connected across a local data bus 210. The mass storage 226 may be configured to store such data as the content media 116 depicted in FIG. 5. The processing device 202 may include any custom made or commercially available processor, a central processing unit (CPU) or an auxiliary processor among several processors associated with the caddy 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components (e.g., the content manager 104) of the caddy 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the caddy 102 comprises a personal computer, these components may interface with one or more user input devices 204, which may comprise a keyboard or a mouse. Note that for various embodiments, however, the caddy 10 may be constructed without an input/output interface so that the patrons cannot change the content being shown on the display unit 106. This allows the content server 132 full control over what media content 116 is displayed on the caddies 102. In alternative embodiments, the user can scroll through media content 116 via a touch screen.

The display unit 106 may comprise a liquid crystal display (LCD) or other display device. In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical). With further reference to FIG. 8, network interface device 206 comprises various components used to transmit and/or receive data over a network environment. By way of example, the network interface 206 may include such devices as a modem, a radio frequency (RF) transceiver, a telephonic interface, a bridge, a router, network card, etc. The network interface 206 may also comprise embedded chip technology which provides wireless capabilities such that the caddy 102A-C acts as a mobile Wi-Fi hotspot. It will be appreciated by persons skilled in the art that a number of implementation details may be varied. For example, the caddie 102A-C may be battery operated or wired to a power source. For some installations, the caddies 102A-C may be fixed to tables, counter tops, or may be freestanding. In battery-operated embodiments, re-chargeable battery packs may be used, and the entire units may be configured to be recharged during off-hours of the restaurant.

Similarly, the content server 132 may be embodied in any one of a wide variety of wired and/or wireless computing devices, such as a desktop computer, portable computer, dedicated server computer, multiprocessor computing device, smart phone, personal digital assistant (PDA), digital camera, and so forth. As with the caddy 102, the content server 132 comprises various components (not shown), including but not limited to, a processing device, I/O interfaces, a network interface, a display, memory, and mass storage connected across a data bus.

Figure 9:
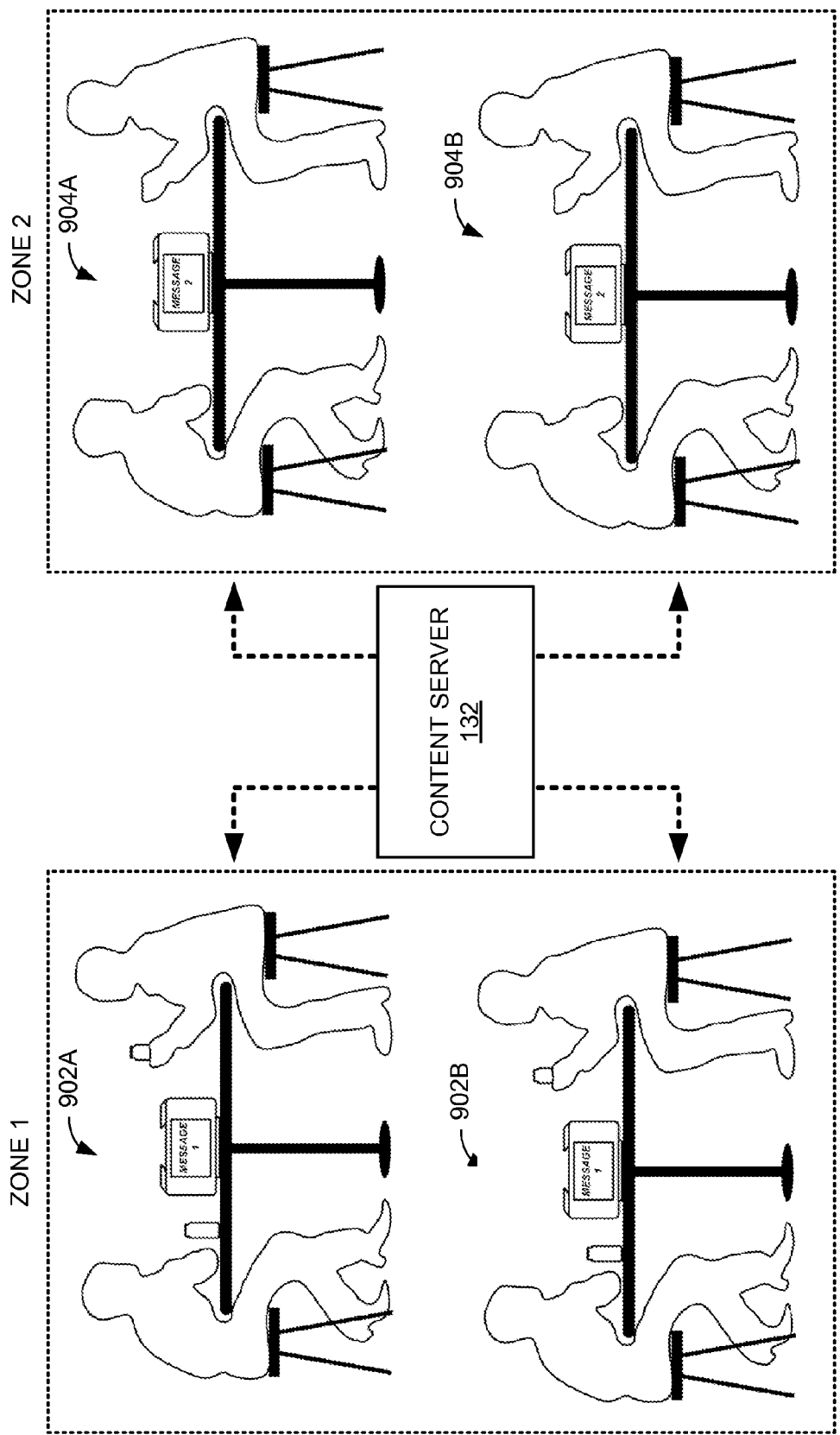
FIG. 9 illustrates an embodiment of the caddy system whereby the content server conveys different media content to different caddies.

Reference is made to FIG. 9, which illustrates an embodiment of the caddy system whereby the content server 132 is configured to transmit different media content 116 to different caddies 102A-C. In some scenarios, it may be advantageous to send media content 116 that is customized according to the make-up of the customers. To illustrate, suppose that the patrons 902A, B seated in "ZONE 1" in FIG. 9 are all adults. "ZONE 1" may be, for example, the bar area in a restaurant. Suppose also that the patrons 904A, B seated in "ZONE 2" comprise both adults and children. ("ZONE 2" may be, for example, the general dining area where families are seated.) The content server 132 may be configured to convey MESSAGE 1 to the patrons 902A, B in "ZONE 1" and convey MESSAGE 2 to the patrons 904A, B in "ZONE 2." MESSAGE 1 may comprise, for example, drink specials (e.g., "Draft beer now for only $1."), while MESSAGE 2 may comprise dinner specials (e.g., "Buy one entrée now and get one free."). The content server 132 allows the restaurant to customize the content media 116 for different parts/sections of the restaurant.

Figure 10:
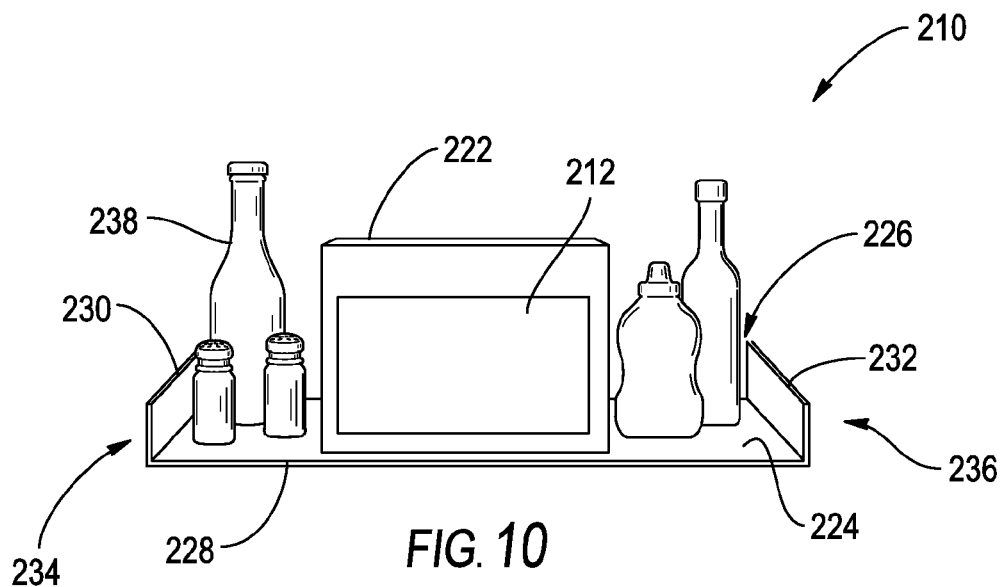
FIG. 10 illustrates an embodiment of a caddy that includes a display unit mounted to a housing.

For the various embodiments of the caddy disclosed herein, the caddy may be coupled to a stationary base unit so that the caddy cannot be inadvertently displaced (e.g., knocked off a table). For some embodiments of the caddie, the display unit may also include a water-resistant screen. FIG. 10 illustrates another embodiment of a caddie. As shown in FIG. 10, caddy 210 includes a display unit 212 that is mounted to a housing 222. In this embodiment, the display unit 212 includes a flat screen display module that is detachable from the housing to facilitate replacement and cleaning, and so on. The housing 222 extends from a lower portion or tray 224 that functions as a base for the caddie. The tray 224 defines one or more compartments (e.g., compartment 226) for stowing various items, such as straws, coasters, condiments, napkins, utensils, salt/pepper shakers, etc. for patrons to use.

In this embodiment, the display unit 212 is centrally positioned along the front edge 228 of the tray 224. Wall members 230, 232 extend upwardly from respective first and second sides 234, 236 of the tray to facilitate placement and corralling of the patron use items (e.g., condiments 238). Optionally, the caddy 210 (as with other embodiments) may include various interfaces, including, but not limited to, a USB port, a mini USB port, an audio port and a speaker (not shown in FIG. 10). Of course, appropriate interface or supporting electronics for each port will also be included, but need not be described herein. In certain embodiments, multiple USB ports may be provided to provide patrons with the ability to charge cell phones and other devices that are chargeable through a USB port.

Figure 11:
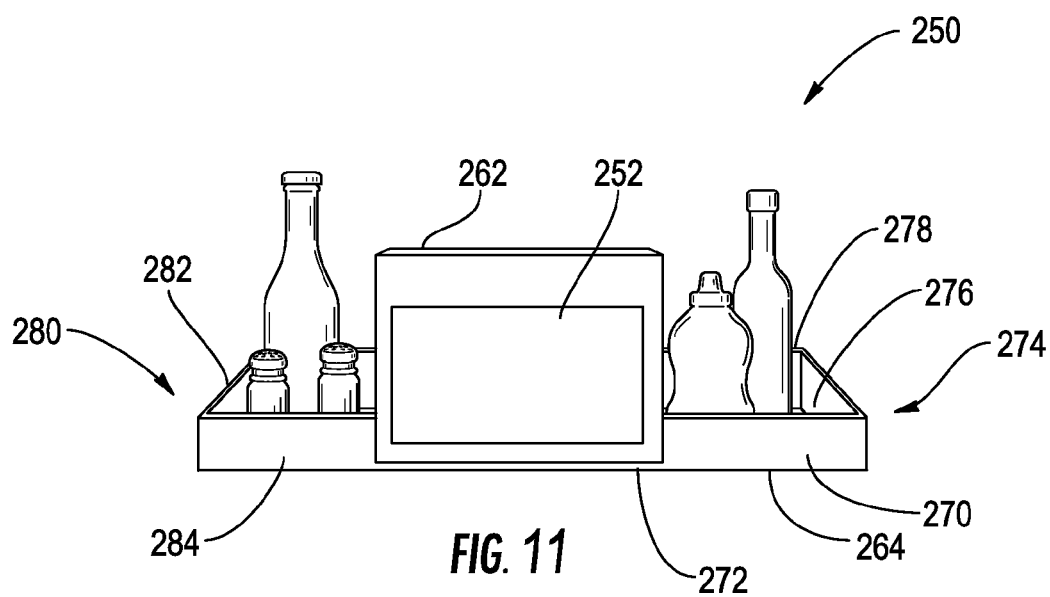
FIG. 11 illustrates an embodiment of a caddy that includes a display unit mounted to a housing, where the housing extends from a tray with wall members extending about the periphery of the tray.

Another embodiment of a caddy is illustrated in FIG. 11. As shown in FIG. 11, caddy 250 includes a display unit 252 that is mounted to a housing 262. In this embodiment, the housing 262 extends from a tray 264 with wall members extending about the periphery of the tray 264. Specifically, wall member 270 extends from the housing along front edge 272 to side 274. Wall member 276 extends along side 274 from wall member 270 to the back edge. Wall member 278 extends along the back edge from wall member 276 to side 280. Wall member 282 extends along side 280 from wall member 278 to front edge 272, and wall member 284 extends along front edge 272 from wall member 282 to housing 262. It should be noted that, although depicted as being generally rectangular and of uniform height in FIG. 11, the configurations of the wall members may vary among embodiments.

Figure 12:
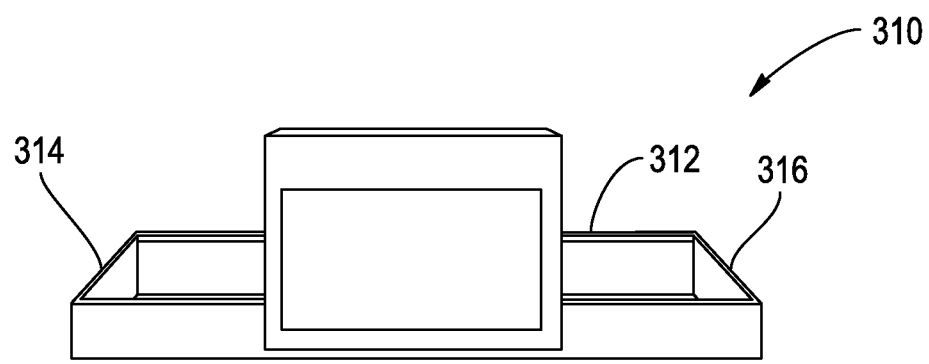
FIG. 12 illustrates an embodiment of a caddy that includes a rail that extends between wall segments.

FIG. 12 illustrates another embodiment of a caddie. In particular, caddy 310 is configured much like the previous embodiments of FIG. 10 and FIG. 11. However, in contrast to the wall member 278 (FIG. 11), caddy 310 include a rail 312 that extends between wall segments 314, 316. In this embodiment, the rail exhibits a generally circular cross section although various other configurations may be used in other embodiments.

Figure 13:
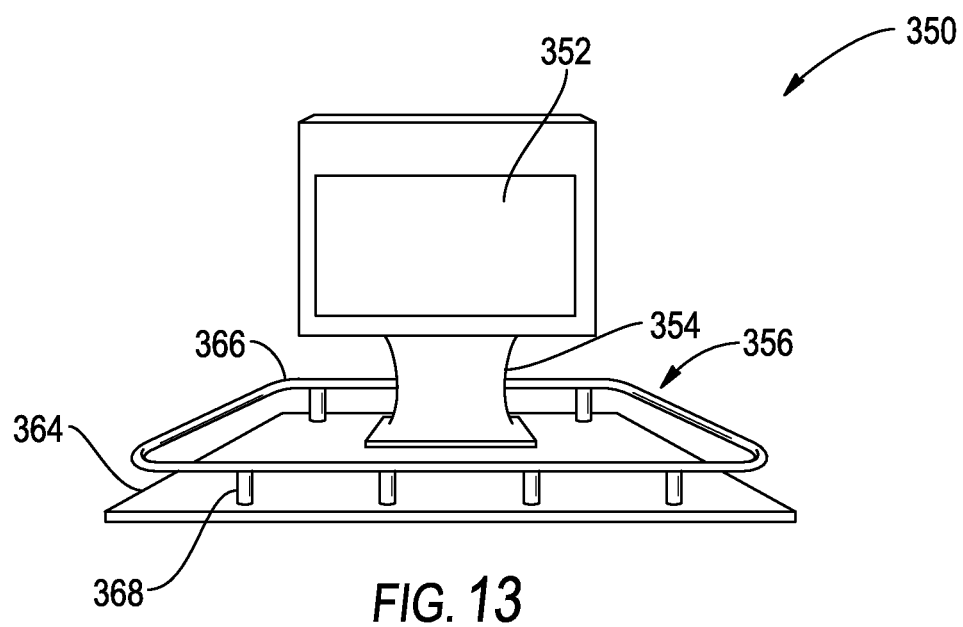
FIG. 13 illustrates an embodiment of a caddy that includes a housing mounted to a pedestal.

Another embodiment of a caddy is illustrated in FIG. 13. As shown in FIG. 13, caddy 350 includes a display unit 352 that is mounted to a housing 362. In this embodiment, the housing is mounted to a pedestal 354, which extends upwardly from a central portion 356 of a tray 364. Although the configuration of the pedestal may vary among embodiments, the height of pedestal 354 is selected to position the display unit above many of the items that may be placed on the tray to facilitate ease of viewing of images displayed by the display unit. Also depicted in FIG. 13 is a rail 366 (e.g., a continuous rail) that extends about the periphery of the tray. In this embodiment, the rail 366 is retained in a raised position, spaced from the upper surface of the tray, by posts (e.g., post 368) that extend upwardly from the tray.

Figure 14:
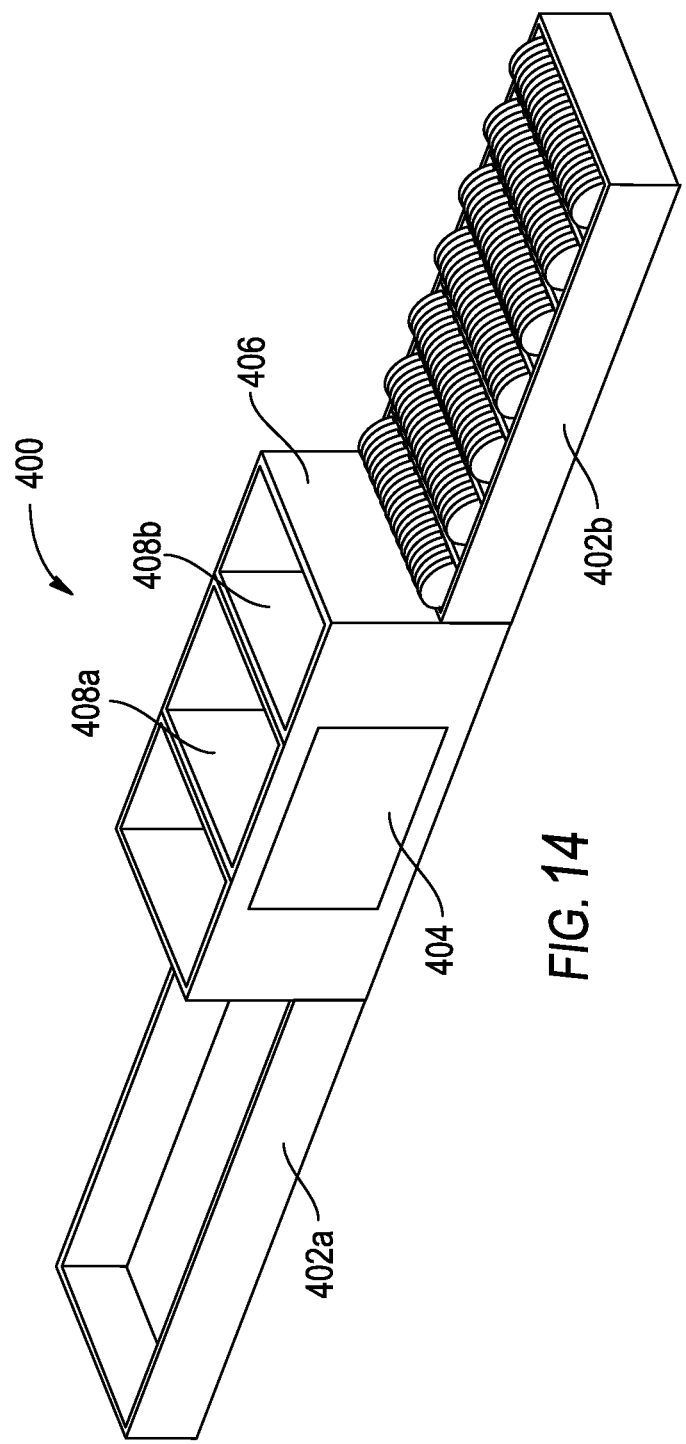
FIG. 14 illustrates an embodiment of a caddy that includes a housing detachably coupled to trays.

Reference is made to FIG. 14, which illustrates another embodiment of a caddy 400. As shown in FIG. 14, caddy 400 includes a display unit 404 that is mounted to a housing 406. In this embodiment, the housing 406 is detachably coupled to trays 402a, 402b. The trays 402a, 402b may be detached from the housing 406 to allow coupling of other modules, trays, etc. to the housing 406. As shown, each tray 402a, 402b includes wall members that extend about the periphery of the tray 402a, 402b. Each tray 402a, 402b may include removable partitions for configuring slots that hold such items as chips, coins, and so on. The partitions may be inserted into the tray 402a, 402b according to the slot size desired. As further shown in FIG. 14, the housing 406 may also include removable partitions 408a, 408b for configuring slots within the housing 406. The slots may hold such patron use items as straws, utensils, condiments, and so on.

Figure 15A:
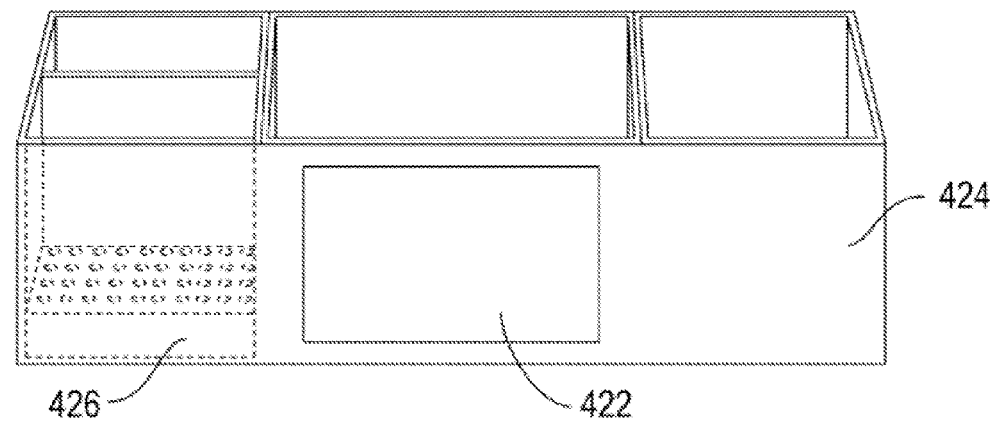
FIG. 15A illustrates an embodiment of a caddy that includes a housing with various compartments for storing items.
Figure 15B:
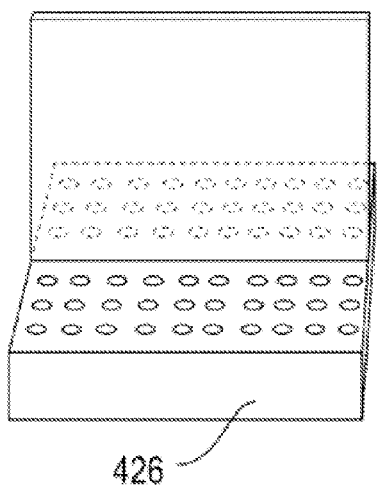
FIG. 15B illustrates an embodiment of a removable insert for one of the compartments shown in FIG. 15A.

FIG. 15 illustrates another embodiment of a caddy 420. As shown in FIG. 15, caddy 420 includes a display unit 422 that is mounted to a housing 424. In this embodiment, the housing 424 includes various compartments for storing straws, utensils, condiments, and other patron use items. Each compartment within the housing 424 includes a removable insert 426 with one or more openings in which items (e.g., straws, drink stirrers) may be inserted. The insert 426 may be constructed of plastic or other suitable material and is removable to facilitate cleaning of the insert 426. The vented construction of the insert 426 also allows for drainage in the event that liquid enters the compartment. For some embodiments, the insert 426 may include a divider portion to facilitate removal of the insert 426 for cleaning purposes.

Figure 16A:
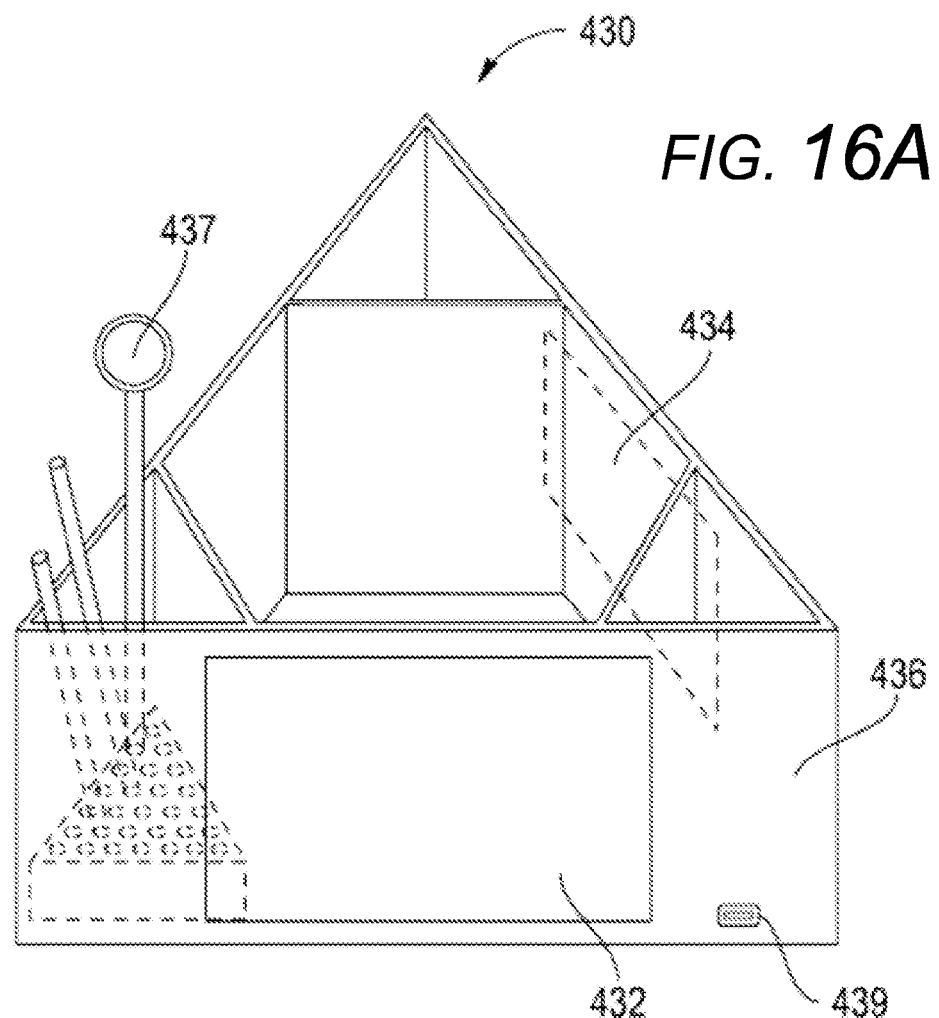
FIG. 16A illustrates an embodiment of a caddy constructed in a triangular configuration.
Figure 16B:
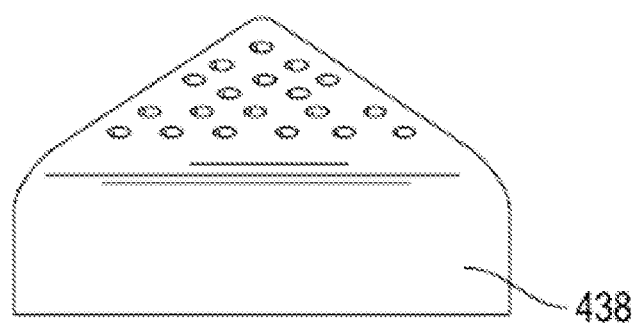
FIG. 16B illustrates an embodiment of a removable insert for one of the compartments shown in FIG. 16A.

FIG. 16 illustrates another embodiment of the caddy 430 constructed in a triangular configuration. It should be noted that, although depicted as being triangular in shape, the caddy 430 may vary among embodiments. In the embodiment shown, the caddy 430 includes multiple display units 432, 434 that may be configured to show the same content or different content to patrons. For some embodiments, the patrons may specify the content being displayed on the particular display unit 432, 434. While the caddy 430 shown includes two display units 432, 434, it should be noted that additional display units 432, 434 may also be integrated into the caddy 430. The housing 436 includes a plurality of compartments for storing items. As further shown, one or more of the compartments of the housing 436 may include a removable insert 438 with one or more openings in which items (e.g., straws, drink stirrers) may be inserted.

The insert 438 may be constructed of plastic or other suitable material and is removable to facilitate cleaning of the insert 438. The vented construction of the insert 438 also allows for drainage in the event that liquid enters the compartment. The caddy 430 also includes one or more interface ports 438 to enable a user to charge an electronic device such as a mobile phone. In some embodiments, the interface port 439 may be configured to allow users to download content from the caddy 430, where the content may include, for example and without limitation, a menu or an advertisement associated with the establishment. For example, a restaurant may allow patrons to download drink specials for the coming week via the interface port 439.

For some embodiments, the insert 438 includes a light source (not shown) at the base of the insert 438. In dark environments, such a light source can be used to create useful and special affects. For example, a tubular object 437 may be placed in the insert 438 and illuminated by the light source to draw attention to the object 437, which may include a graphic, text, and so on (e.g., by channeling light through the tubular object). For example, the object 437 may include a graphic for a particular brand of beverage. For some embodiments, the light source in the insert 438 may illuminate an object (not shown) that then re-directs light to a section of the caddy 430.

In other embodiments (e.g., embodiments where the central compartment of the housing 436 is covered), a tubular insert (not specifically illustrated) may have an arced upper end with an opening at the end that projects light communicated from the light source through the tube. This projected light may be directed to a graphic or object to be illuminated (e.g., a graphic on the cover of the housing 436).

Figure 17A:
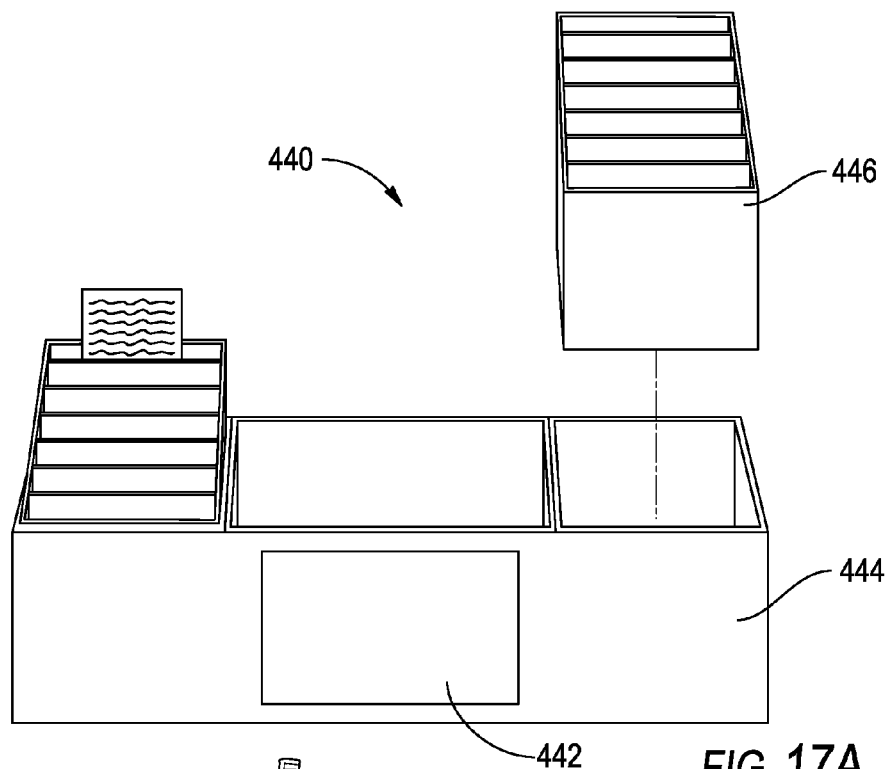
FIGS. 17A and 17B illustrate embodiments of caddies, where each caddy includes a housing with one or more compartments configured to hold one or more storage modules.
Figure 17B:
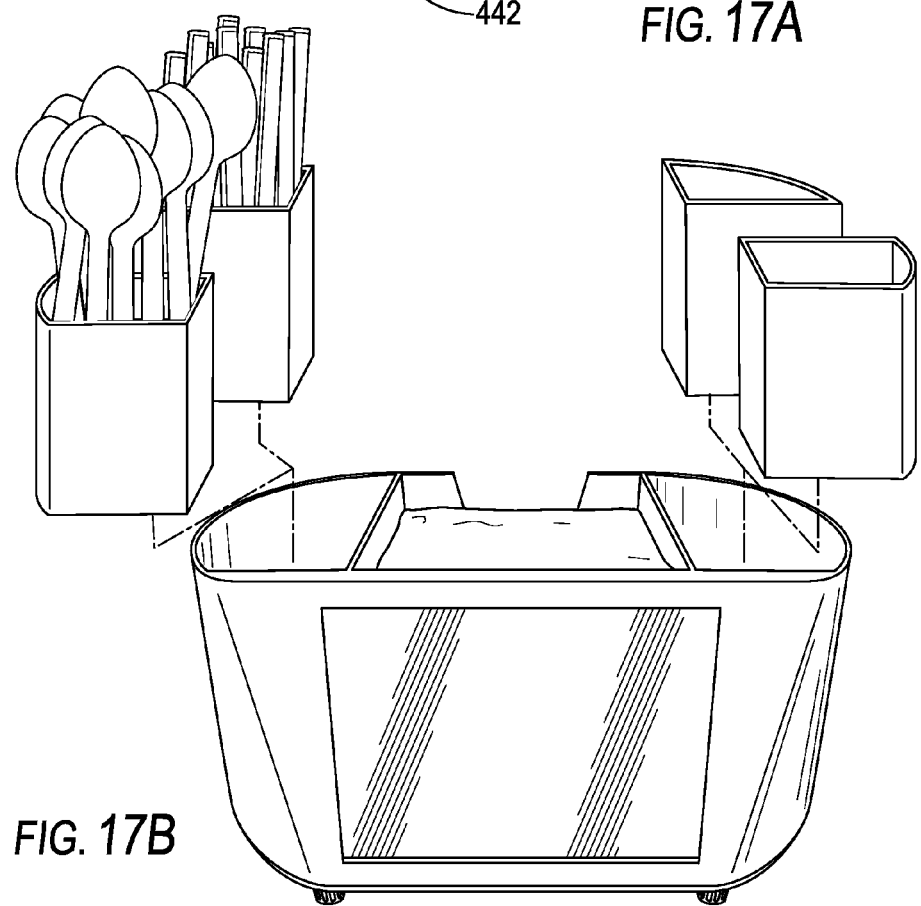

FIGS. 17A and 17B illustrate other embodiments of the caddy 440. As shown, the caddy 440 includes a display unit 442 mounted to a housing 444, where the housing 444 includes one or more compartments. In the embodiment shown, each compartment may be configured to hold a storage module 446 for storing such items as bank slips, forms, and so on. The storage module 446 may comprise, for example, a tray constructed of plastic or other suitable material with compartments for holding items. As shown in FIGS. 17A and 17B, the storage module 446 may be constructed according to any desired shape to hold various items. For example, while FIG. 17B shows storage modules of the same height, the storage modules may be constructed to vary in height, depending on the items to be inserted into the storage modules.

Figure 18:
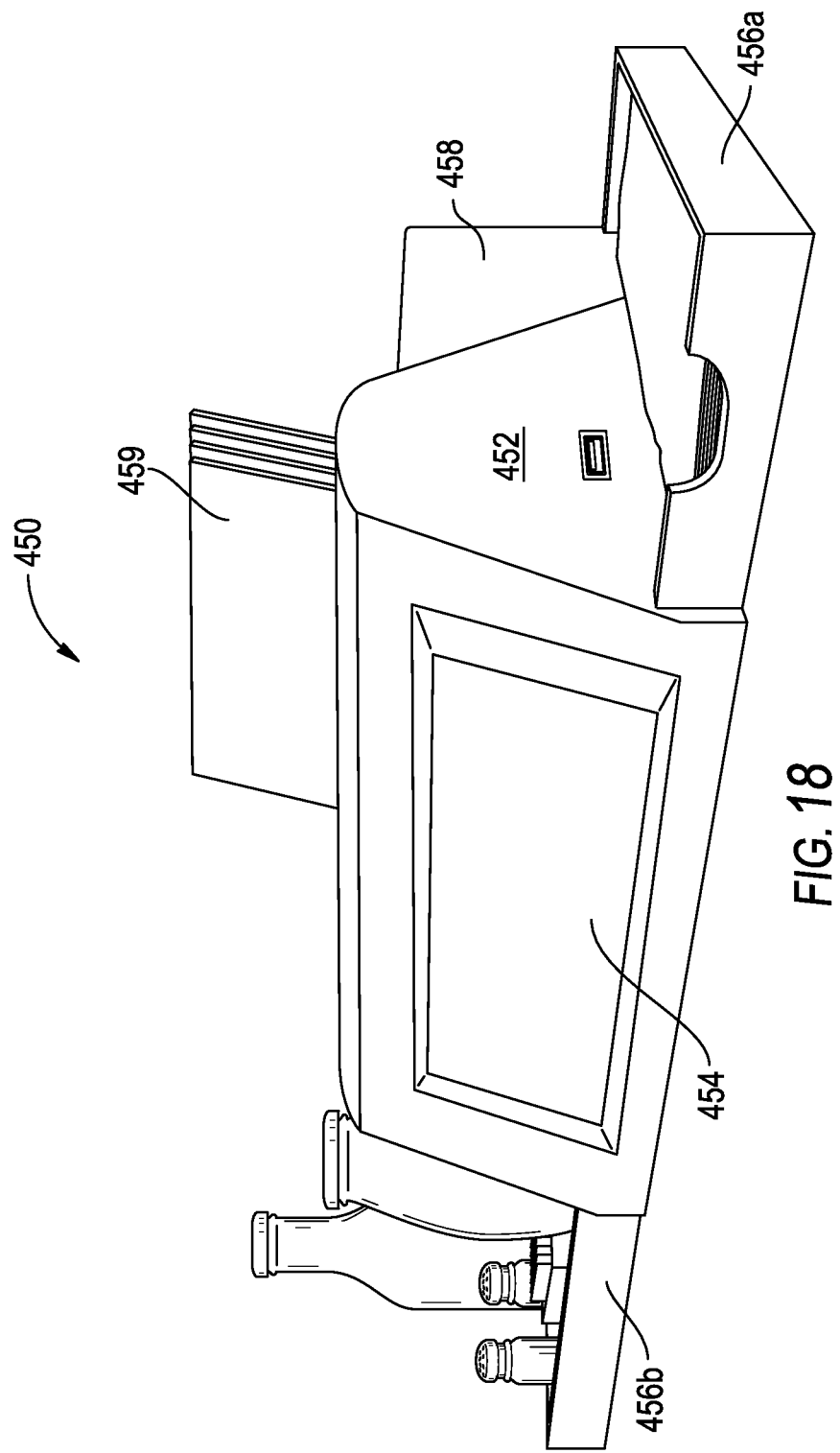
FIG. 18 illustrates an embodiment of a caddy that includes a housing with trays on the sides, where the trays may be detachably coupled to the housing.

FIG. 18 illustrates another embodiment of the caddy 450 that includes a housing 452 and a display unit 454 mounted onto the housing 452. As shown, the housing 452 includes trays 456a, 456b on the sides, where the trays 456a, 456b may be detachably coupled to the housing 452. The housing 452 also includes a compartment 458 located behind the housing 452, where the compartment 458 is configured to store larger items 459 such as menus, flyers, and other items. As shown, the housing 452 may include a USB port or other type of interface port.

Figure 19A:
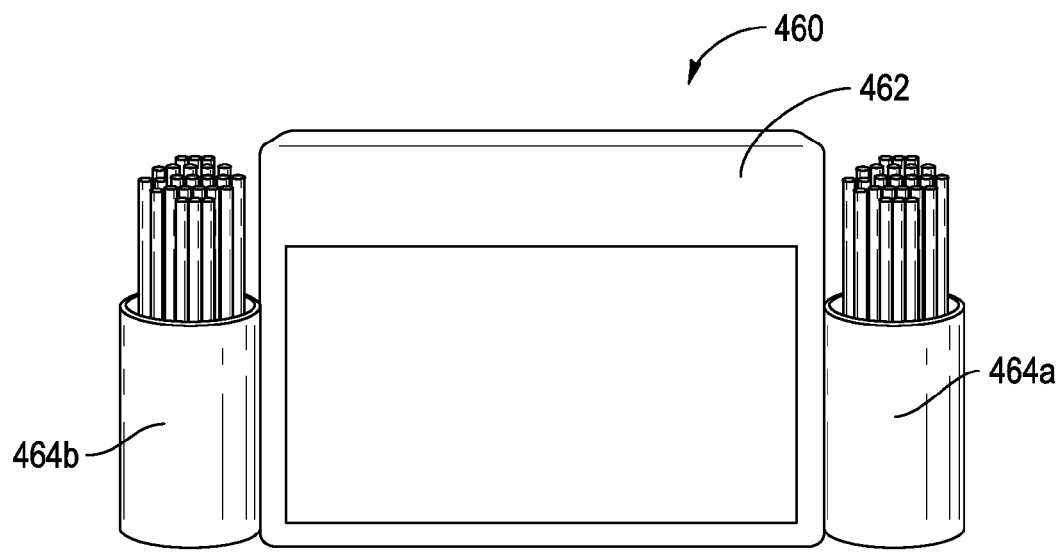
FIG. 19A illustrates a front view of an embodiment of a caddy that includes a housing detachably coupled to two cylindrical storage modules.
Figure 19B:
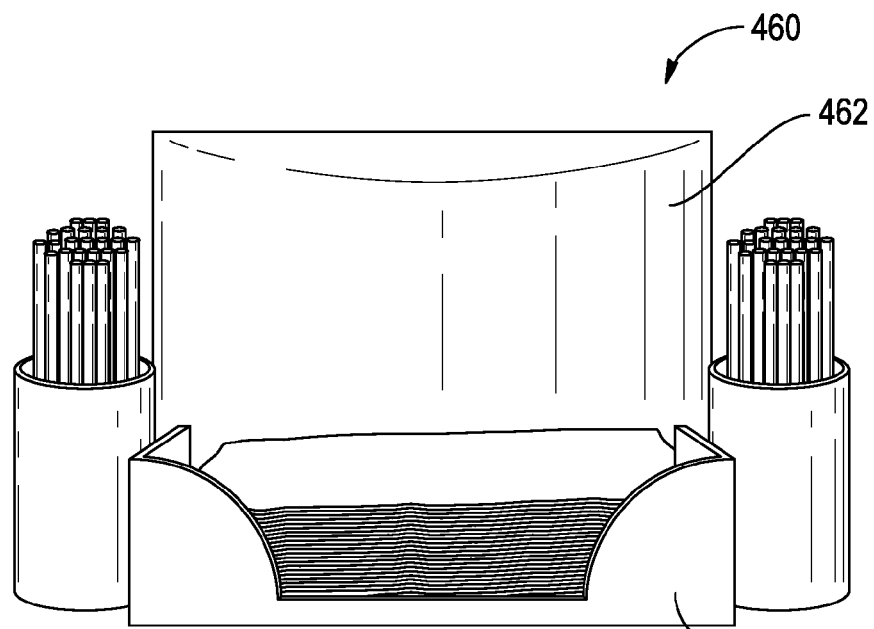
FIG. 19B illustrates a back view of the caddy depicted in FIG. 19A.
Figure 20A:
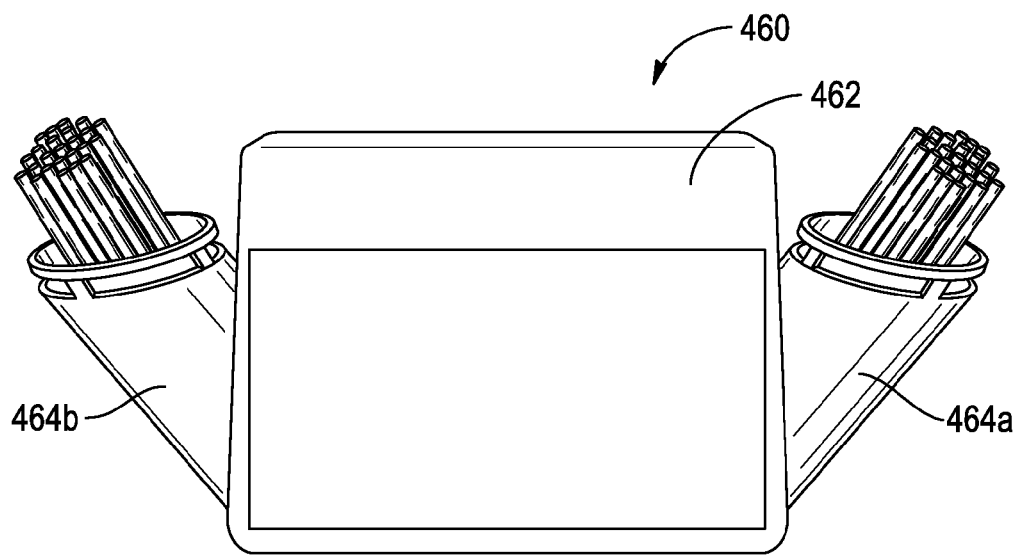
FIG. 20A illustrates a front view of another embodiment of a caddy that includes a housing detachably coupled to two storage modules.
Figure 20B:
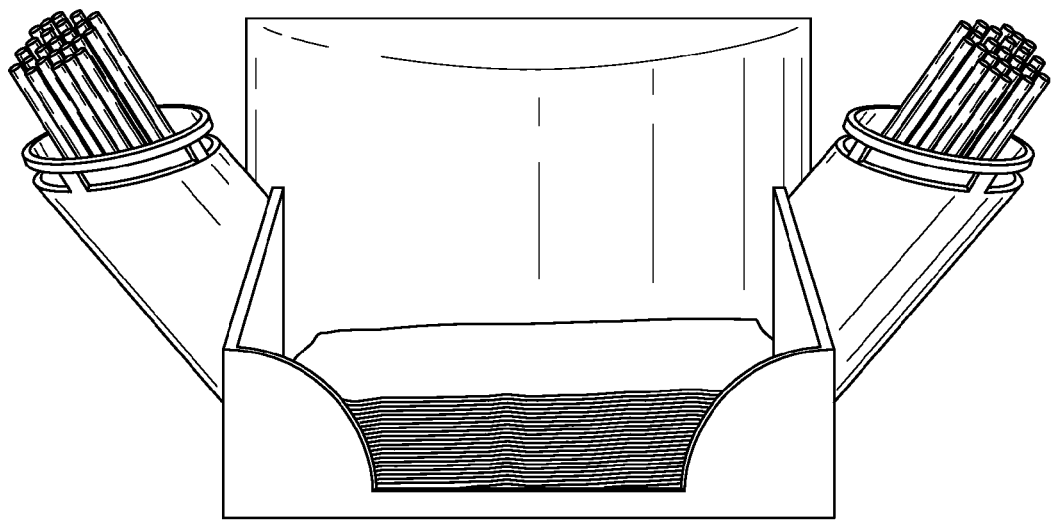
FIG. 20B illustrates a back view of the caddy depicted in FIG. 20A.

FIGS. 19A and 19B show another embodiment of the caddy 460 where FIG. 19A is a front view of the caddy 460, and FIG. 19B is a back view. The caddy 460 includes a housing 462 detachably coupled to two cylindrical storage modules 464a, 464b for storing such items as straws, pens, and other items. Each storage module 464a, 464b may include a removable insert (not shown) in which straws and other items may be inserted. It should be noted that, although depicted as being cylindrical, the shape of the storage modules 464a, 464b may vary among embodiments. As further shown in FIG. 19B, the housing 462 may also be coupled to a tray 466 configured to hold additional items such as napkins, menus, and so on. FIGS. 20A and 20B show a variation of the caddy 460 shown in FIGS. 19A and 19B whereby FIG. 20A is a front view of the caddy 460, and FIG. 20B is a back view.

Figure 21:
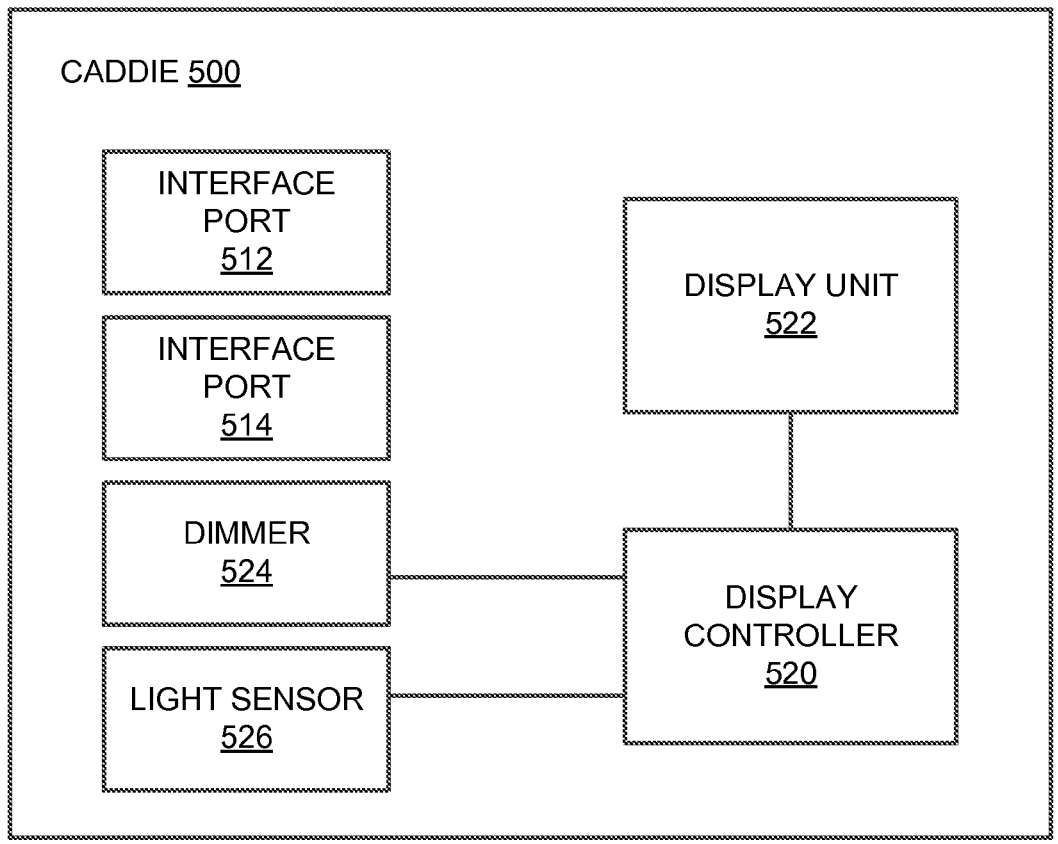
FIG. 21 is a block diagram of a caddy in accordance with various embodiments of the present disclosure.
Figure 22:
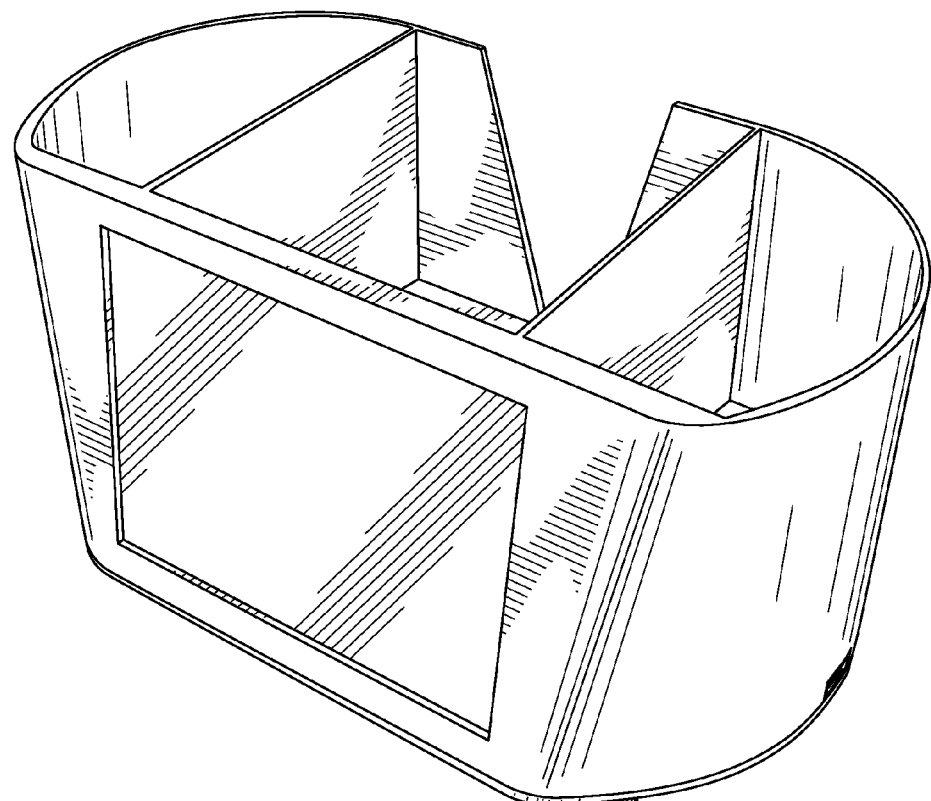
FIG. 22 is a perspective view of an embodiment of a caddy with feet for adjusting the height of the base.
Figure 23:
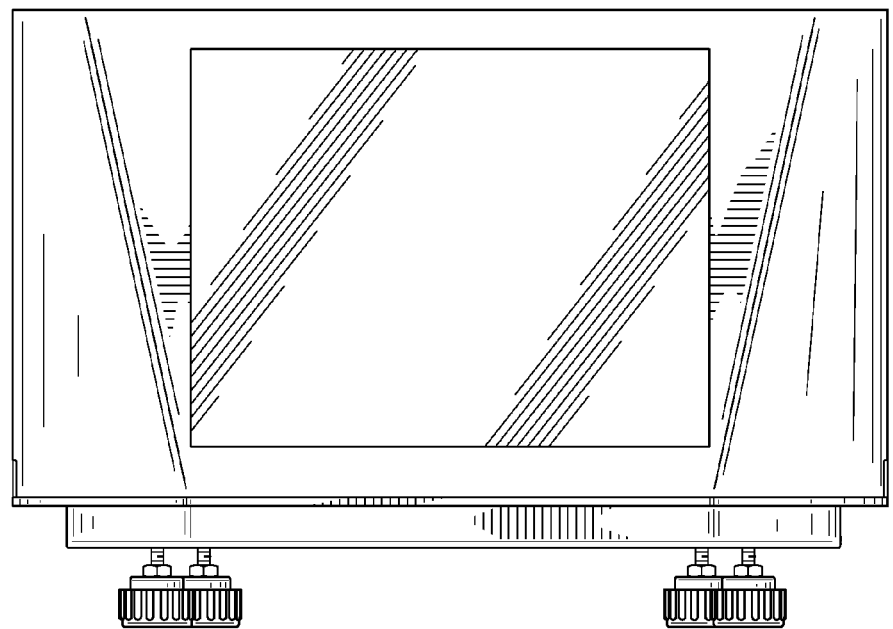
FIG. 23 is a front view of the caddy depicted in FIG. 22.
Figure 27:
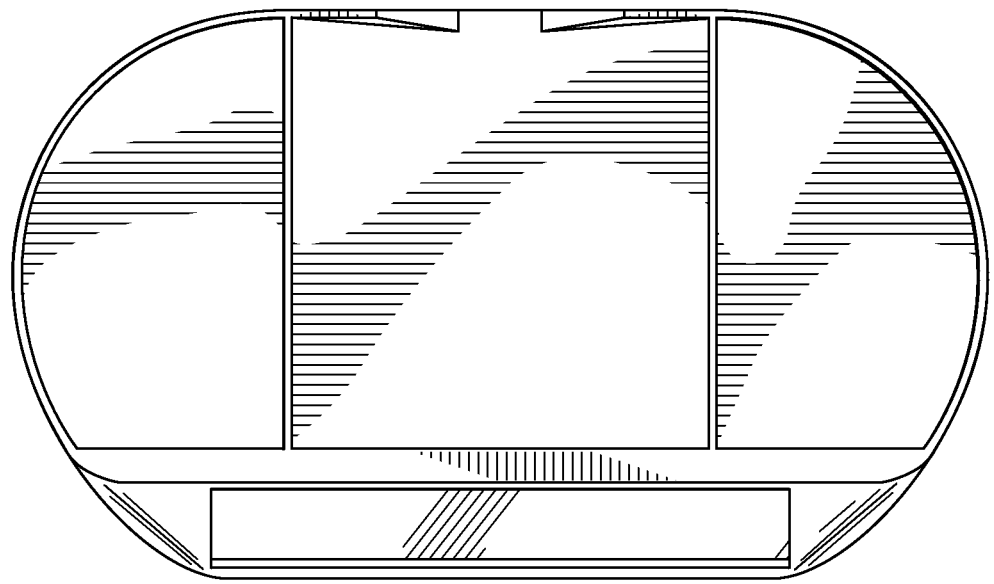
FIG. 27 is a top view of the caddy depicted in FIG. 22.
Figure 28:
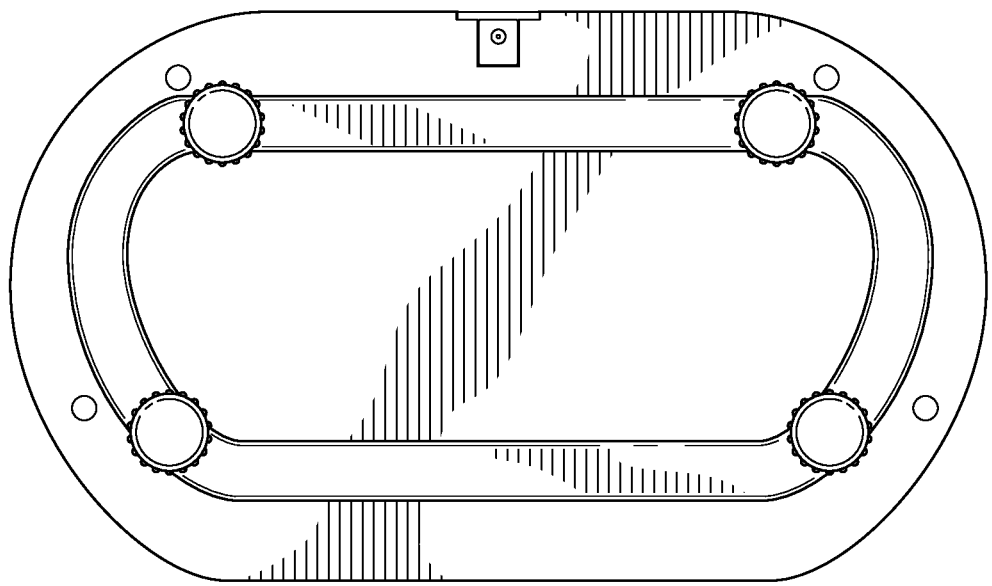
FIG. 28 is a bottom view of the caddy depicted in FIG. 22.

Reference is made to FIG. 21, which is a block diagram of a caddy 500 in accordance with various embodiments of the present disclosure. The caddy 500 includes a display unit 522, which may embodied as a flat-panel display such as, for example, a liquid crystal display (LCD) that is sized appropriately for the particular caddy 500. The display unit 522 is coupled to a display controller 520, which is further coupled to a dimmer 524 configured to adjust the brightness level of the display 524. Note that other display controls (e.g., contrast level adjuster) may also be included. For some embodiments, the display controller 520 is coupled to a light sensor 526 configured to automatically adjust the brightness level of the display unit 522.

The light sensor is configured to automatically provide a control signal to the display controller corresponding to a sensed ambient light level and generates one or more control signals that are received by the display controller 520. The display controller 520 adjusts display parameters of the display unit 522 according to the one or more control signals. As shown, the caddy 510 includes interface ports 512, 514 configured to allow patrons to charge electronic devices such as smartphones, cell phones, tablet PCs, etc. via the caddy 510. The interface ports 512, 514 may also be coupled to mass storage 226 (FIG. 8) for retrieving content so that patrons may download the retrieved content to their electronic devices. For example, patrons may download menus, advertisements, and other content via the interface ports 512, 514.

FIGS. 22-28 illustrate an embodiment of the caddy with height-adjustable feet. In accordance with some embodiments, the caddy may include height-adjustable feet for raising or lowering the housing of the caddy. The housing of the caddy may be constructed with a series of holes designed to receive the feet where threaded portions of the feet are rotated until the desired height is achieved. Note that while round height-adjustable feet are depicted in FIGS. 22-28, the feet may be constructed according to other shapes as well. Also, while the feet are shown with a threaded portion, other adjusting means may also be incorporated for adjusting the height of the housing.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A caddy for conveying content to patrons in an establishment, the caddy comprising:
    a housing shaped as a triangular prism, the triangular prism defining sides of the housing and three inner corners of the housing;
    multiple display units mounted on the housing to display the content, wherein any given side of the housing includes only one of the display units and at least two sides of the housing include one of the display units;
    at least one interface port to enable a user to charge an electronic device;
    a control circuit in communication with the interface port, the control circuit programmed to allow a user to download the content via the interface port;
    a central compartment shaped as a hexagonal prism; and
    three corner compartments, each of the corner compartments shaped as a triangular prism and located at one of the corners of the housing, wherein at least one of the three corner compartments further comprises a removable insert for storing items, the removable insert defining a plurality of openings to receive the items.

2. The caddy of claim 1, wherein the removable insert is vented to allow drainage of liquid inside one of the corner compartments.

3. The caddy of claim 1, wherein the interface port is a USB (Universal Serial Bus) port.

4. The caddy of claim 1, wherein the content includes at least one of a menu or advertisement.

5. The caddy of claim 1, further including a light source located at a base of the insert.

6. A caddy system comprising:
    at least one caddy for conveying content to patrons in an establishment, the caddy comprising:
        a housing shaped as a triangular prism, the triangular prism defining sides of the housing and three inner corners of the housing;
        multiple display units mounted on the housing to display the content, wherein any given side of the housing includes only one of the display units and at least two sides of the housing include one of the display units;
        at least one interface port to enable a user to charge an electronic device;
        a control circuit in communication with the interface port, the control circuit programmed to allow a user to download the content via the interface port;
        a central compartment shaped as a hexagonal prism; and
        three corner compartments, each of the corner compartments shaped as a triangular prism and located at one of the corners of the housing, wherein at least one of the three corner compartments further comprises a removable insert for storing items, the removable insert defining a plurality of openings to receive the items, and
    a content server communicatively coupled to the caddy via a network, the content server being configured to transmit the content to the caddy to be rendered for display on the display units, wherein the content server is further configured to obtain the content from at least one third party to be rendered for display on the display units of the caddy, wherein the content server is located remotely from the establishment, and wherein the content server controls transmission of the content obtained from the at least one third party to the caddy according to an arrangement controlled by the content server.

7. The system of claim 6, wherein the arrangement corresponds to at least one of: at least one predetermined time interval for displaying the content on the display units of the caddy, wherein the content server is configured to forward the content obtained from the at least one third party according to the at least one predetermined time interval; and a predetermined grouping of brand-specific advertisements.

8. The system of claim 6, wherein the removable insert is vented to allow drainage of liquid inside one of the corner compartments.

9. The system of claim 6, wherein the interface port is a USB (Universal Serial Bus) port.

10. The system of claim 6, wherein the content includes at least one of a menu or advertisement.

11. The system of claim 6, wherein the caddy further includes a light source located at a base of the insert.

* * * * *